United States Patent [19]

Lunceford et al.

[11] Patent Number: 5,764,973
[45] Date of Patent: Jun. 9, 1998

[54] SYSTEM FOR GENERATING STRUCTURED QUERY LANGUAGE STATEMENTS AND INTEGRATING LEGACY SYSTEMS

[75] Inventors: Paul Lunceford, Bethesda, Md.; Robert Huff, Sterling, Va.; Mohanaharan Mylvaganam, Silver Spring, Md.

[73] Assignee: enterWorks.com, Inc., Ashburn, Va.

[21] Appl. No.: 527,432

[22] Filed: Sep. 13, 1995

Related U.S. Application Data

[63] Continuation of Ser. No. 193,532, Feb. 8, 1994, abandoned.

[51] Int. Cl.$^6$ ..................................................... G06F 17/30
[52] U.S. Cl. ........................ 395/601; 395/603; 395/604; 395/608; 395/611; 395/614; 395/702; 395/703; 395/701; 395/440
[58] Field of Search ................................. 395/600, 700, 395/650, 601, 603, 604, 608, 611, 614, 702, 703, 701, 440

[56] References Cited

U.S. PATENT DOCUMENTS

| | | | |
|---|---|---|---|
| 4,688,195 | 8/1987 | Thompson et al. | 395/12 |
| 4,774,661 | 9/1988 | Kumpati | 395/600 |
| 4,805,099 | 2/1989 | Huber | 395/600 |
| 5,181,162 | 1/1993 | Smith et al. | 364/419.19 |
| 5,197,005 | 3/1993 | Schwartz et al. | 364/419.13 |
| 5,212,787 | 5/1993 | Baker et al. | 395/600 |
| 5,237,678 | 8/1993 | Kuechler et al. | 395/600 |
| 5,295,256 | 3/1994 | Bapat | 395/500 |
| 5,303,367 | 4/1994 | Leenstra, Sr. et al. | 395/600 |
| 5,325,465 | 6/1994 | Hung et al. | 364/419.19 |
| 5,335,346 | 8/1994 | Fabbio | 395/600 |
| 5,377,350 | 12/1994 | Skinner | 395/600 |
| 5,390,330 | 2/1995 | Talati | 395/700 |
| 5,418,957 | 5/1995 | Narayan | 395/600 |
| 5,442,784 | 8/1995 | Powers et al. | 395/600 |
| 5,448,726 | 9/1995 | Cramsie et al. | 395/600 |
| 5,499,371 | 3/1996 | Henninger et al. | 395/700 |

*Primary Examiner*—Thomas G. Black
*Assistant Examiner*—Cheryl R. Lewis
*Attorney, Agent, or Firm*—Hale and Dorr LLP

[57] ABSTRACT

The present invention relates to a system for integrating a plurality of data structures by modeling the existing data structures, and creating a data dictionary that links logical elements to data elements in those data structures. A user can simply request logical data elements that he would like to see and the system will calculate the links necessary to return the proper data from the appropriate data structures. This system may integrate most types of data structures including relational databases, object-oriented databases, hierarchical files and flat files. Furthermore, the system can process textual, numeric, audio and visual data.

20 Claims, 35 Drawing Sheets

GE BSI CONSTITUTION DEFENDED
AN
1993

ER THE CONSTITUTION OF THE BRITISH STANDARDS INSTITU-
OW'S ANNUAL MEETING, WHICH WOULD GIVE THE BOARD
AVE BEEN DEFENDED BY LEADING DIRECTORS.

S, THE NON-EXECUTIVE CHAIRMAN, AND RAM MYLVAGANAM,
DIRECTOR, REJECTED CRITICISM THAT ADDITIONAL POWERS
A DIMINUTION OF MEMBERS' INFLUENCE BY MAKING THE
RE LIKE A COMMERCIAL COMPANY.

ID:"WHETHER IT IS BSI OR ICI, YOU HAVE GOT TO BE
UCTIVITY, COST EFFICIENCY AND GETTING RID OF BUREAU-

ERSON, THE FORMER CHIEF EXECUTIVE OF THE INSTITU-
NE AFTER A BOARDROOM CLASH.

OMORROW WILL BE ASKED TO APPROVE PROPOSALS GIVING

%MYLVAGANUM

CONTEXT HITS
MYLVAGANAM

HIT 1 OF 1

PREVIOUS HIT
NEXT HIT

FIND

FORM EDITING

NAME  PAUL LUNCEFORD
USERNAME  LUNCEP
PASSWORD  LUNCEP

AUTHORIZED SERVER ACCESSES

M204.SCOTT
TRYSTER.SA

SECURITY CLASSES

REVOKE
S1
S2
S3

S1
S2
S3

ADD USER
REMOVE USER
CHANGE PASSWORD
SHOW TABLE PERMISSIONS

PASSWORD CHANGED.

FIG. 25

FORM EDITING

NAME  M204

CLASS  ORACLE6

OPEN CLIENT  ☐ FALSE

NETWORK INFORMATION  @T:ASTERIX:M2C

3DB
DB2
FILE_SERVER
INGRES
ORACLE6
SQL_SERVER

USER ACCESSES

ADD  DELETE

SCOTT
SYSTEM

RESULTS

ADD SERVER    DROP SERVER

SERVER ADDED.
SERVER"M204"UPDATED. SERVER CLASS IS ' ORACLE
NETWORK INFO: '@T:ASTERIX:M204'
RUN THE 'CHECKPOINT' COMMAND IN THE MASTER

FORM EDITING

SERVER: M204
USERNAME: SCOTT
PASSWORD: TIGER

USERS
DAVE DEGENITO
MOHANAHARAN MYLVAGANAN
OMNI SYSTEM MANAGER
PAUL LUNCEFORD

AUTHORIZED USERS
DAVE DEGENITO
MOHANAHARAN MYLVAGANAN
PAUL LUNCEFORD

REMOVE

RESULTS
USER 'LUNCEP' WILL BE KNOWN AS 'SCOTT' IN REMOTE SERVER 'M204'.

| FORM EDITING | |
|---|---|
| TABLE `EMP` | BINARY |
| NAME `ENAME` | BIT |
| DATATYPE `CHAR` | CHAR |
| LENGTH `10` | DATETIME |
| ALLOW NULLS ☐ TRUE | DOCUMENT |
| | FLOAT |
| CATALOG REFERENCES | IMAGE |
| | INT |
| EMPLOYEE'S NAME | MONEY |
| | REAL |
| | SMALLDATETIME |
| | SMALLINT |
| | SMALLMONEY |
| | SOUND |
| | SYSNAME |
| | TEXT |
| | TIMESTAMP |
| | TINYINT |

FORM EDITING

CATALOG ENTRY [EMPLOYEE'S IDENTIFICATION]
FIELD [RTNSHP.EMPNO]

DATABASES
- MAIL
- NEWS
- PUBS2
- RELATIONSHIP

TABLES
- RTNSHP

FIELDS
- AU_ID
- EMPNO
- RELATIONSHIP

USAGE [ADD FIELD]

[CONVERT(INT,RTNSHP.EMPNO)]

- CHARACTER CONVERSION
- INTEGER CONVERSION
- FLOATING POINT CONVERSION
- SUBSTRING CREATION
- MULTIPLICATION
- DIVISION
- ADDITION
- SUBTRACTION
- OPEN PARENTHESIS
- CLOSE PARENTHESIS
- COMMA

FIG.35

SYSTEM FOR GENERATING STRUCTURED QUERY LANGUAGE STATEMENTS AND INTEGRATING LEGACY SYSTEMS

This application is a continuation of application Ser. No. 08/193,532, filed Feb. 8, 1994, now abandoned.

FIELD OF THE INVENTION

This invention relates to a system that generates SQL statements to provide access to both relational and non-relational data which is located on multiple systems.

BACKGROUND OF THE INVENTION

Over the course of many years, most companies have developed a multitude of systems to track the stand-alone and interrelated elements of their operations. These systems are commonly referred to as "legacy systems."

In conjunction with changes in technology, these systems have grown from flat files to hierarchical and network structures, and finally to relational structures operating in a client-server environment. As a result, a company may have an incredible amount of data spread across a wide range of hardware and software combinations. Often, similar or related data is physically or logically separate from like data, and cannot be brought together to perform needed analysis.

Furthermore, many information systems are composed of incompatible and proprietary components based on obsolete mainframe technology which can become quite expensive for a company to maintain. Over time, an increasingly large proportion of a company's budget is spent maintaining and fixing its legacy systems, which results in less money available to meet new system requirements.

Many tools are becoming available to support the trend towards integrating a company's existing information resources into a cohesive environment. These tools often incorporate Structured Query Language (SQL) capabilities as in most commercial database products.

Unfortunately, the reach of these integration protocols is limited to information stored in applications which support that protocol. They provide no utility when you want to access data in non-relational databases, such as flat files or object-oriented databases.

As one skilled in the art would know, it is both common and efficient to maintain data in object-oriented databases as explained in detail in Booch, Grady, *Object Oriented Design with Applications*, The Benjamin/Cummings Publishing Co., Inc. (1991), which is fully incorporated herein by reference. However, legacy systems are almost always maintained in environments which are not supported by the object-oriented database.

Accordingly, if a company would like to maintain data in a single object-oriented database, the system administrator must manually copy data from the legacy systems into the object-oriented databases, which can be both costly and time consuming. Furthermore, the possibility of errors in transcription arises, as well as the danger of lost data.

Several systems have sought to overcome this problem by creating an interface between different types of databases or operating environments. Several commercial off-the-shelf (COTS) products, such as Omni which is marketed by Sybase Inc., 5820 Shellmound Street, Emoryville, Calif. 94608 or EDASQL which is marketed by Information Builders Inc., 1250 Broadway, New York, N.Y. 10001, perform these interface functions by surveying a company's different databases on the legacy systems and creating a "wrapper" around them to make them look like relational databases, so that they can all interact with each other.

However, the users of many of these COTS systems must know not only where and how the data is stored, but also how to access it using Structured Query Language (SQL), the format of which is both complex and often difficult to learn. Likewise, the user must know how different data elements in different databases relate to one another.

SUMMARY OF THE INVENTION

The present invention overcomes the shortfalls in the art by creating an environment for integrating information stored in the full range of data structures including: flat files, hierarchical databases, network databases, relational databases, and object-oriented databases. The system can support the integration of not only text and numeric data, but also video, sound and graphics.

The system involves using an object-oriented interface to integrate the various information systems into a single framework while still maintaining the legacy systems undisturbed. This approach lends itself to modeling of the entire problem domain instead of just one small aspect of the problem.

Once the model is defined, access to data in each of the legacy systems can be developed using rapid prototyping techniques. This is accomplished in such a way that the user does not need to know Structured Query Language (SQL). Likewise, the user need not know how or where the data is actually stored.

This methodology protects a company's investment in its existing information systems and no information is lost or has its intended use changed. No retraining costs are associated with the people who use the legacy systems, and there is no need to discard the tools and methods developed by the people who use and analyze the data in those legacy systems.

Furthermore, the present system requires no modification of a company's existing systems and data, or the associated testing of the new system to ensure that no problems have been introduced by the changes. Likewise, no changes are introduced in how the systems are used by the employee.

This invention provides the system developer and end-user with a consistent interface and uniform relational view of the data across all systems, and provides the ability to incorporate and access other information assets in the future, regardless of their structures, and uses a graphical user interface such as GoODE marketed by Servio Corporation, 2085 Hamilton Avenue, Suite 200, San Jose, Calif. 95128 to present a uniform relational view of the data from a company's legacy systems.

Finally, this system provides a means for migrating the information from the legacy information systems into an integrated object-oriented environment without the danger of losing valuable data and/or time.

The following is a list of some of the objects and advantages of the present invention:

The invention provides a consistent user interface across all of the legacy information systems.

The invention provides a uniform relational view of the data drawn from the legacy information systems.

The invention provides the user with the ability to manipulate data in an object-oriented environment which does not have the limitations of mixing different types of information as found in the legacy systems.

The invention provides the user with the ability to build and store data requests for future use and store the results with the data itself so that it is easy to use and find in the future.

The invention provides a means for developing applications which can keep the raw data in the legacy systems while still being able to retrieve it for use in a new analysis. It also provides a means for gradually migrating the information from the legacy systems into a new consolidated system using either relational or object-oriented technology.

The system allows the end user to identify new relationships within the data on different legacy systems which had not previously been apparent due to the inability to bring together the necessary pieces of data.

The system allows the user to access data over various systems without knowing the location of the data or even how to query a database using SQL.

This system provides the user with an easy way to access data located on multiple systems by setting up a data dictionary which tracks the location of all data on legacy systems and automatically generates SQL statements based on a user's choice of data without requiring the user to know how one set of data relates to another set of data.

With these and other objects, advantages and features of the invention that may become apparent, the nature of the invention may be more clearly understood by reference to the following detailed description of the invention, the appended claims and the several drawings attached hereto.

BRIEF DESCRIPTION OF THE DRAWINGS

FIG. 18 is the user screen to input qualifiers for the query.

FIG. 20 is the other results form screen which allows the user to search outside files for photographs, voices, unstructured text and the like.

FIG. 21 is the document screen which allows the user to review documents which are returned from text searches.

FIG. 25 is the screen which allows the system administrator to update the attributes of users.

FIG. 27 is the screen which allows the system administrator to update the attributes of database servers.

FIG. 28 is the screen that allows the system administrator to update the attributes of a user's access to servers.

FIG. 30 is the screen that allows the system administrator to update the attributes of a database.

Figure 31:
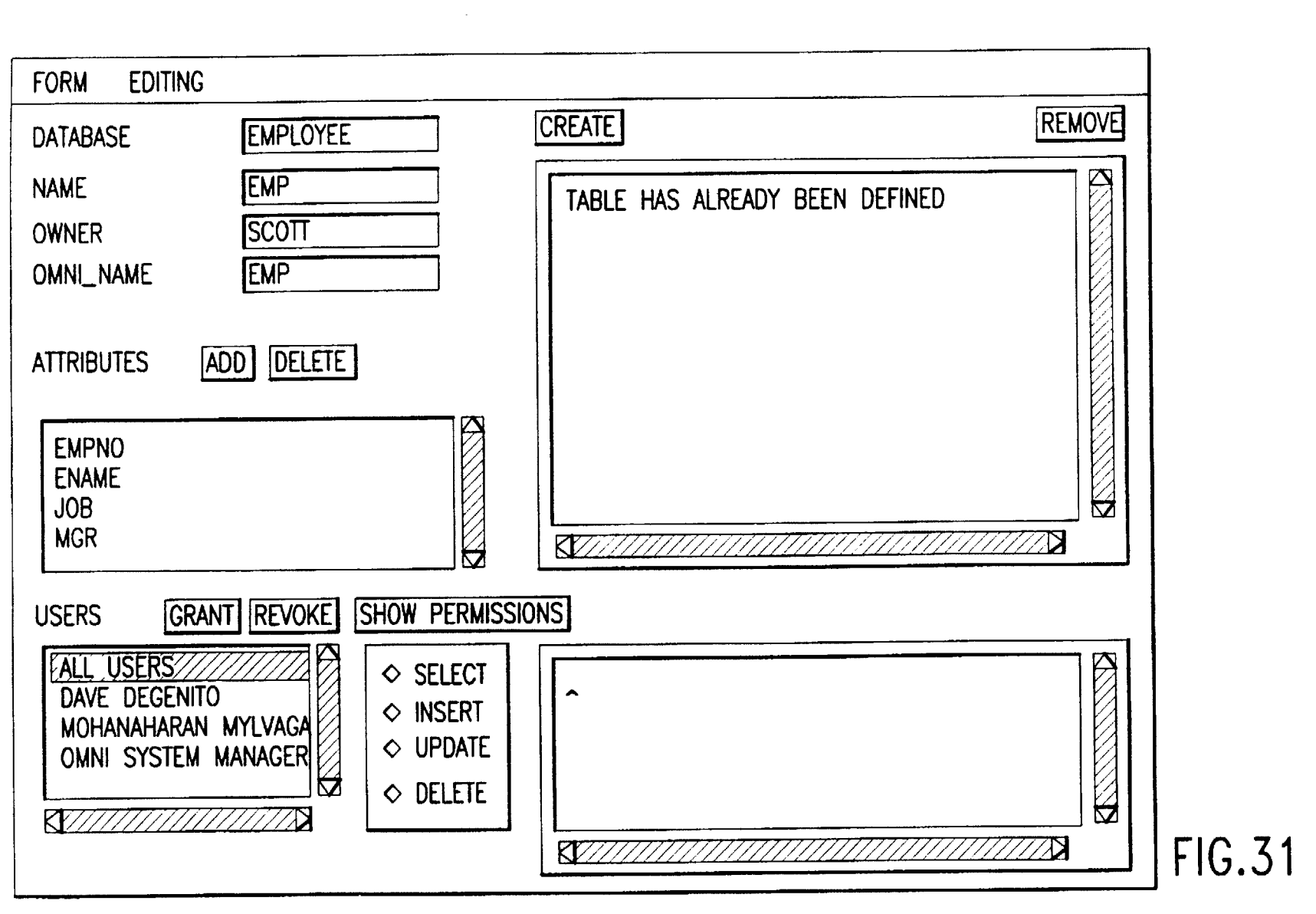

FIG. 31 is the screen that allows the system administrator to update the attributes of tables.

FIG. 32 is the screen that allows the system administrator to update the attributes of data elements.

FIG. 34 is the screen that allows the system administrator to updates the attributes of data elements in the metacatalog.

FIG. 35 is the screen that allows the system administrator to link logical elements to physical elements in the metacatalog.

DETAILED DESCRIPTION OF THE PREFERRED EMBODIMENT

The capabilities of the system for each individual user can vary greatly depending on the user, the security clearance of that user, the legacy systems to which the user has access, and the projects to which the user is assigned. These differences arise because the user will not be able to see data to which he does not have access. The process of ascertaining the information that each user can see will be described in detail below in the user section.

All data entered or stored in this system (as opposed to in the legacy system) will be maintained in object-oriented databases. Accordingly, all references to the retrieval of data from these databases will be carried out using known object-oriented database techniques. All objects or data stored on the object-oriented database will be referred to as logical elements, while all data elements in the relational-like tables of the legacy systems will be referred to as physical elements.

These object-oriented databases are stored in a database management system such as Gemstone, marketed by Servio Corporation, 2085 Hamilton Avenue, Suite 200, San Jose, Calif. 95128, will store all information to be used by the system administrator and user alike. They will contain all of the log-in information and permissions for the system, as well as the information regarding the structure of the physical data stored in the legacy systems. Furthermore, one of these databases will contain the metacatalog, the object-oriented database which contains the data dictionary that stores information on all logical data elements and the physical elements to which they point. Moreover, the object-oriented databases can also contain any data migrated from legacy systems. The contents of these databases will be more fully described below.

FIGS. 1–14 are provided as block diagrams to identify the flow of information as well as to show how the system for generating structured query language statements and integrating legacy systems operates. FIGS. 15–35 are provided to show the screens that are used in the preferred embodiment. Elements will only be labeled on the block diagrams because only the end-user's view of the system can be seen in the screens, not the full workings of the system.

Figure 1:
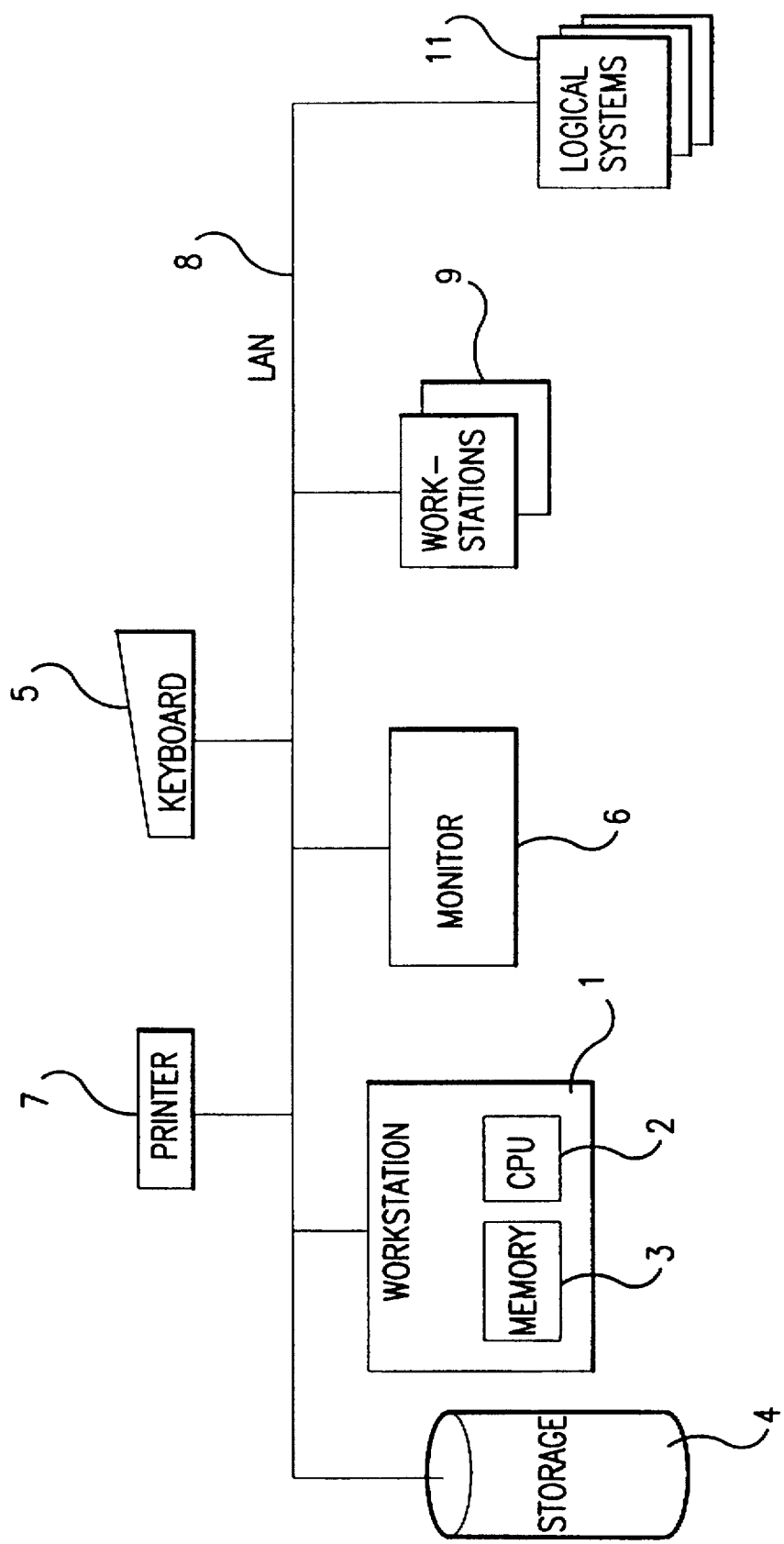
FIG. 1 is a hardware block diagram of the preferred embodiment of this computerized system.

Referring now to the drawings, particularly FIG. 1, the preferred embodiment of the system for incorporating legacy systems is shown. A typical computer workstation 1 will contain a central processing unit 2, a main memory 3 and can be coupled to storage devices 4 such as an magnetic disks, an input device such as a keyboard 5 or mouse, an output device such as a computer monitor screen 6 and a printer 7. One or more such storage devices may be utilized. The preferred embodiment utilizes a Sun workstation operating on a UNIX operating system with at least 60 megabytes of diskspace and at least 16 megabytes of RAM. The system will operate more quickly with more memory.

The system may be coupled to a Local Area Network (LAN) or other communications in order to link with other computer workstations, and to have access to data from other legacy systems 11 which in turn may be stored on other computers similar to the one described above.

Figure 1A:
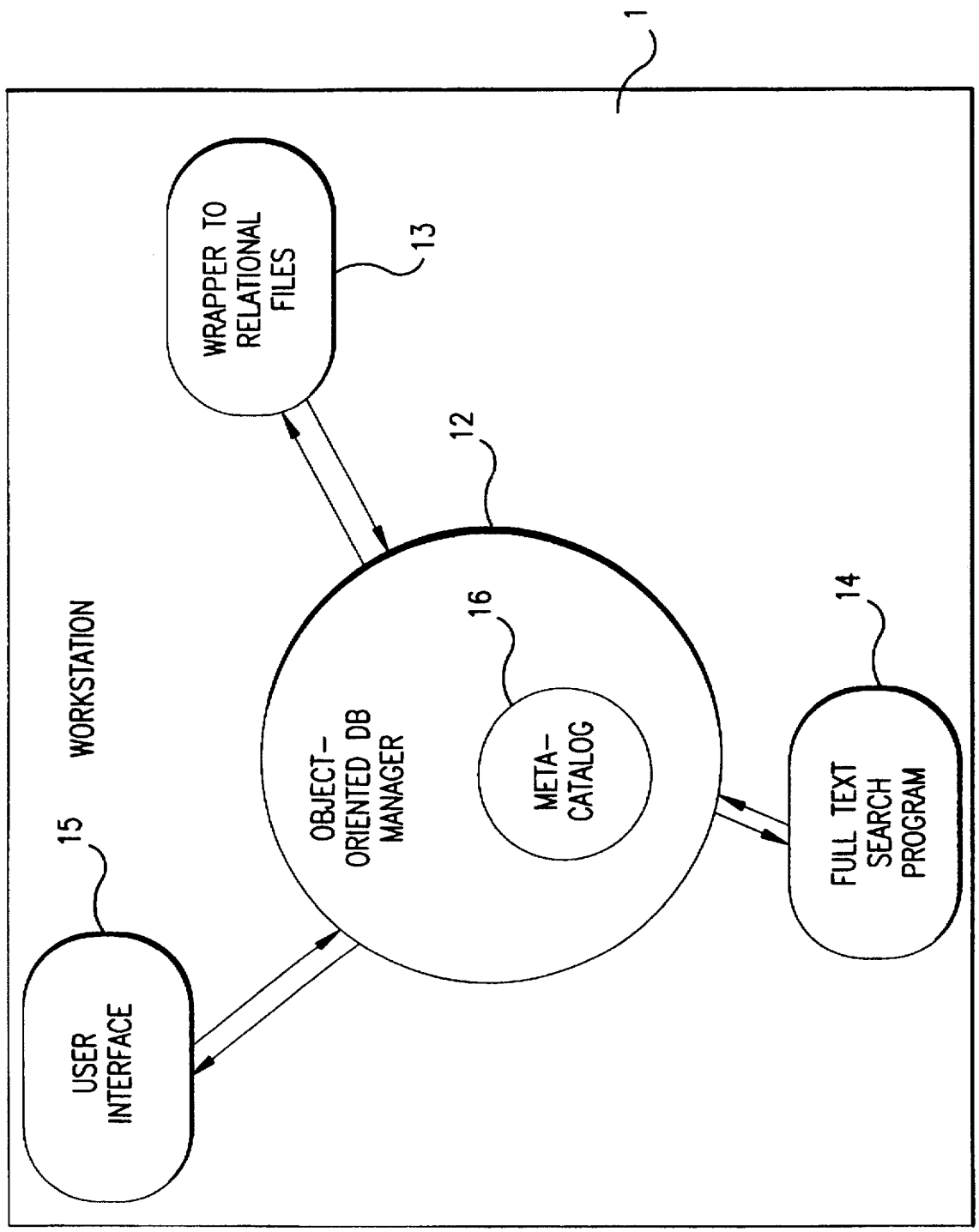
FIG. 1a is a diagram depicting how the software, databases and files interact on the system.

As seen in FIG. 1a, an object-oriented database management tool 12 such as Gemstone marketed by Servio will be stored on the main computer workstation, as well as a product that creates a wrapper around external files to make them look like relational database tables 13, such as Omni marketed by Sybase. Likewise, a full-text search capability COTS product 14, such as Texis marketed by Thunderstone Software, 11115 Edgewater Drive, Cleveland, Ohio 44102, can be accessed from the main computer workstation. A COTS user interface 15 such as GeODE marketed by Servio will also be stored on the main computer workstation to allow the user to generate his own forms at any time. The relevant portions of the user's guide for all the above COTS product is incorporated herein by reference. All COTS products stored on or accessible by the main computer system can interact with each other, as well as access all files and databases available on that computer workstation, and on the LAN.

The metacatalog 16 is stored in the object-oriented database manager and all information in the metacatalog, as well as information needed to run this system will be accessed through the use of the object-oriented database management tool.

Figure 2:
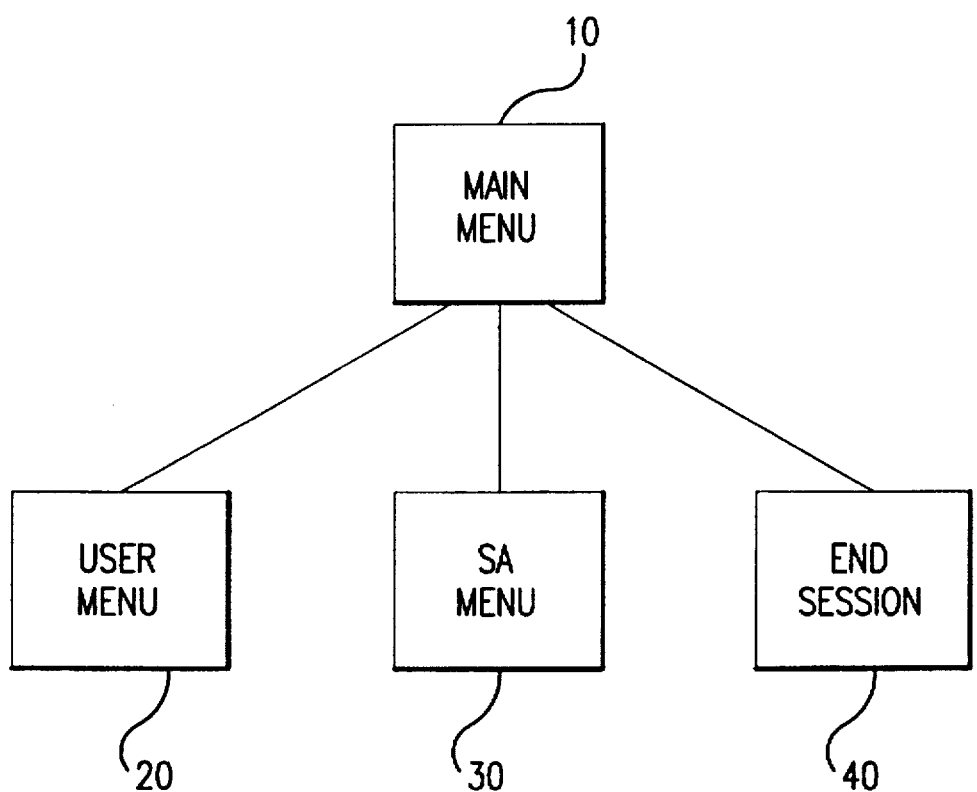
FIG. 2 is a block flow diagram of the main menu of the system.
Figure 15:
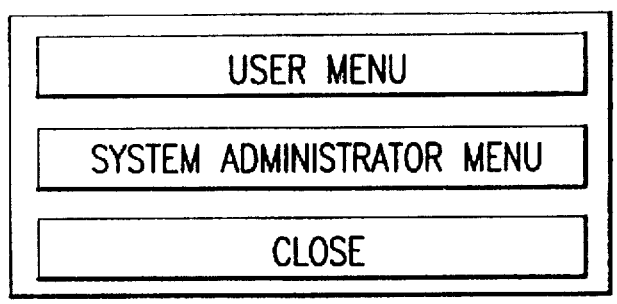
FIG. 15 is the main menu screen for the system.

As seen in the block diagram of FIG. 2 and in screen form in FIG. 15, the user may enter the system through the main menu 10 and may choose to see the user menu 20, the system administrator menu 30 or end the session 40.

SYSTEM ADMINISTRATOR FUNCTIONS

Figure 3:
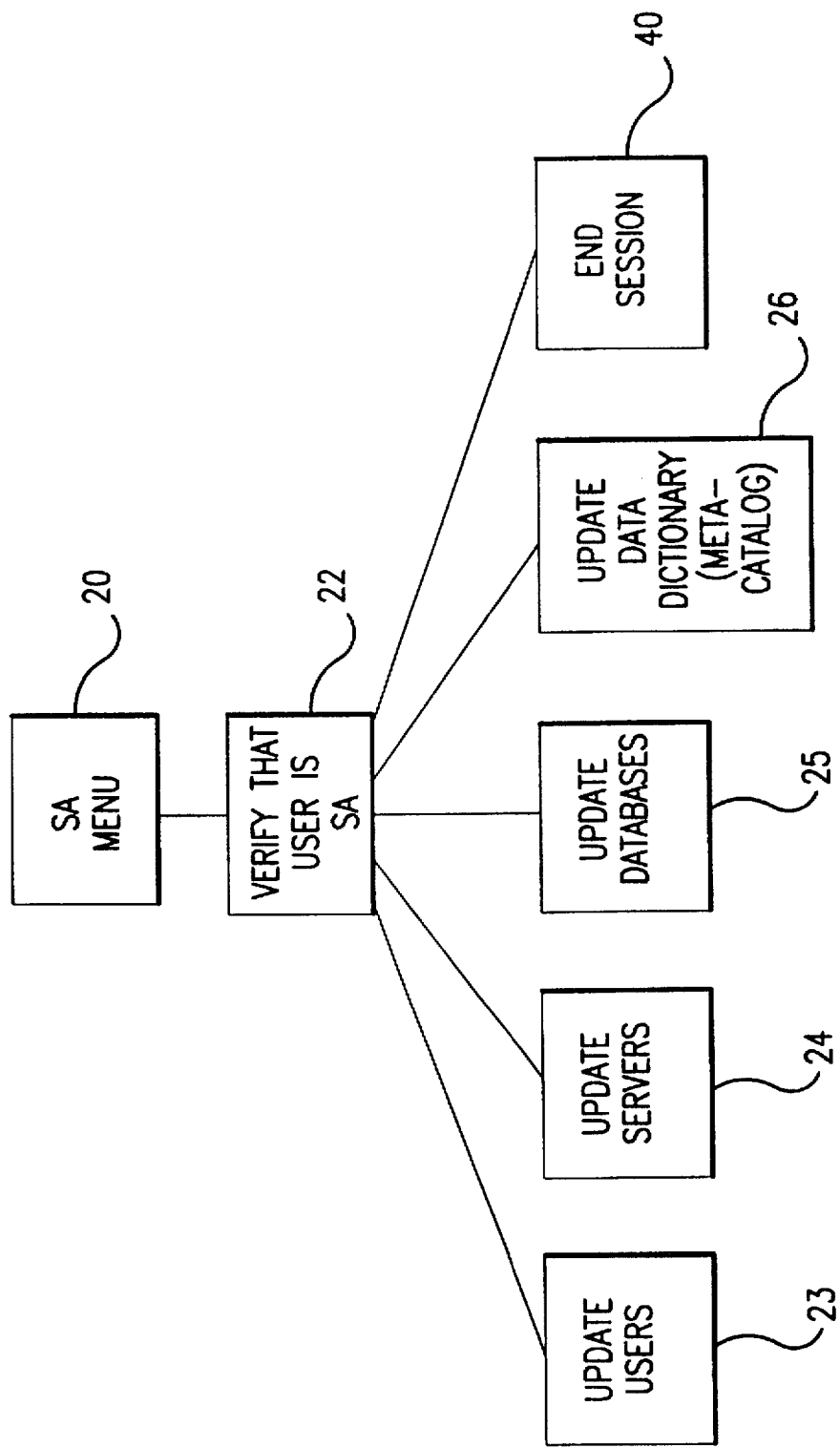
FIG. 3 is a block flow diagram of the system administrator menu of the system.

Before a user uses the system, a system administrator (SA) must first initialize the system in the following manner: Referring new to FIG. 3, the system will first verify that the user is the SA by comparing the SA's identification to the pre-stored SA identification. If the user is not the SA, the user will be instructed that he does not have access to SA functions of the system.

Once the system has verified that the user is the SA, he may choose from one of the following options: define users and the information each may access 23; define servers that may be accessed with the appropriate authorizations 24; define databases, tables and physical elements stored in the legacy systems 25; define logical data elements within the metacatalog and the physical data to which each logical data element points 26; or end the session 40. These functions may be performed in any order and may each be performed repeatedly. All information entered by the SA will be stored and accessed through the object-oriented databases. Each function performed by the SA will be more fully described below.

Figure 23:
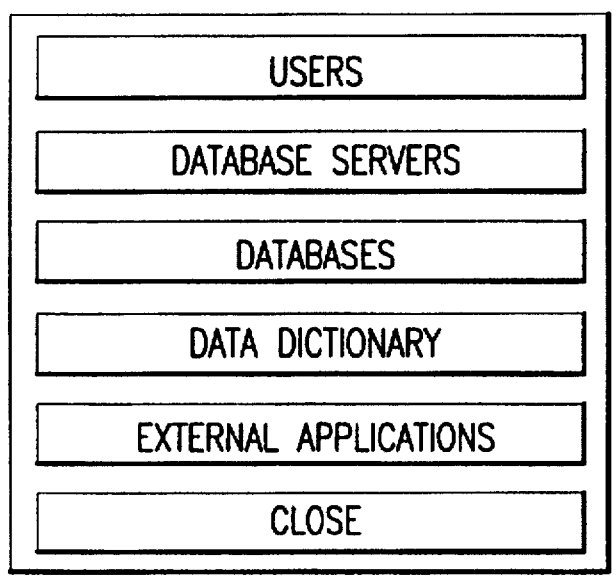
FIG. 23 is the system administrator menu screen.

Each of the above listed actions are available for the SA to choose from the main SA menu screen shown in FIG. 23.

Figure 4:
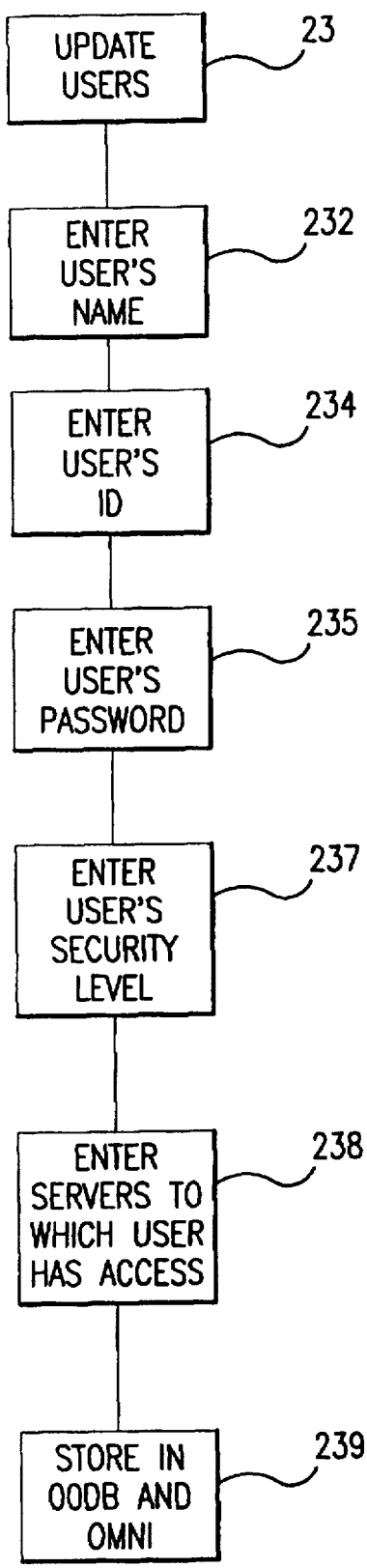
FIG. 4 is a block flow diagram depicting how the system administrator updates users in the system.

As seen in block diagram in FIG. 4 and in screen form in FIG. 25, to define users that may use the system, the SA will first enter the user's name 232 and user's identification 234 as well as the password for the database manager such as Omni 235 for the user by entering the appropriate keys on the keyboard or other input device. The SA will also indicate the security clearance or level 237 of each user by typing the appropriate keys on the keyboard or selecting from a list of possible security clearances by using a mouse or input device. All of the above information will be stored in the object-oriented database as well as passed to Omni for storage therein 239.

Figure 24:
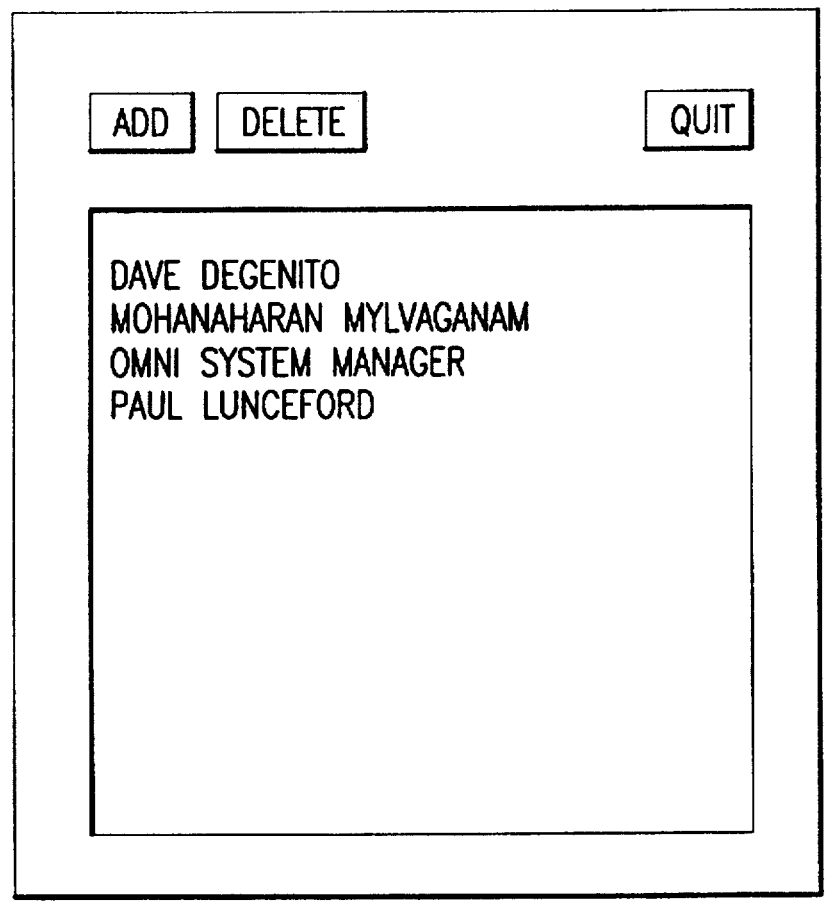
FIG. 24 is the screen which allows the system administrator to add and remove users.
Figure 26:
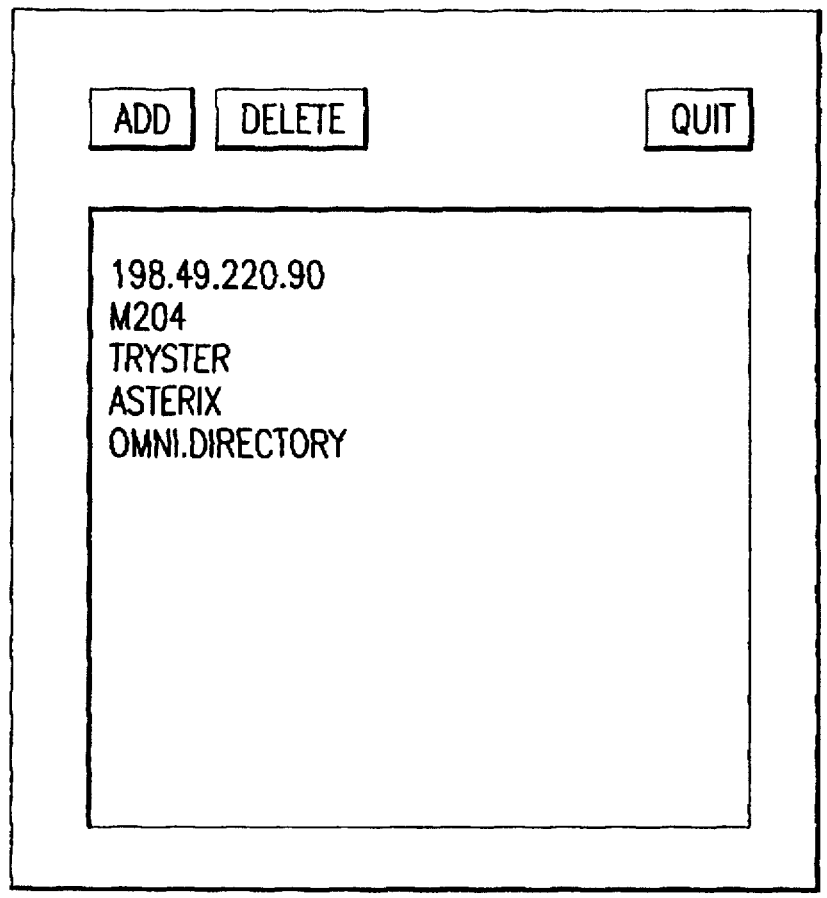
FIG. 26 is the screen which allows the system administrator to add and remove database servers.

The SA may also delete users or change information about each user by deleting the information previously entered into the database and entering new information as discussed above through the use of standard object-oriented procedures, as seen in screen form in FIG. 24.

Figure 5:
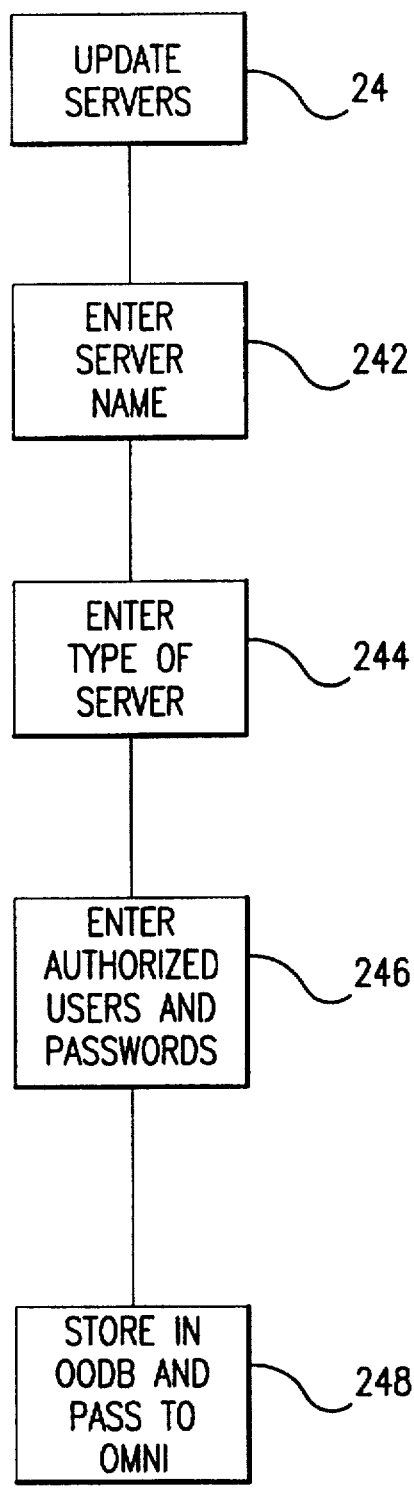
FIG. 5 is a block flow diagram depicting how the system administrator updates servers in the system.

As seen in block diagram in FIG. 5 and in screen form in FIG. 27, the SA may also identify which servers will be used in the system 24 by typing in the name of the server 242 as well as the type of system that will be accessed 244 (i.e. Sybase file, Oracle file, flat file, etc.) The SA will also identify which users may use each server along with each user's identification and password for each individual system 246 as also seen in screen form in FIG. 28. Again this information will be stored in a database for later use by the users and passed to Omni 24 which will create the links to those systems. The SA may at any time add or delete servers by depressing the appropriate keys on a mouse or keyboard as seen in screen form in FIG. 26. When added or removed, the object-oriented databases and Omni will be updated accordingly.

Figure 6:
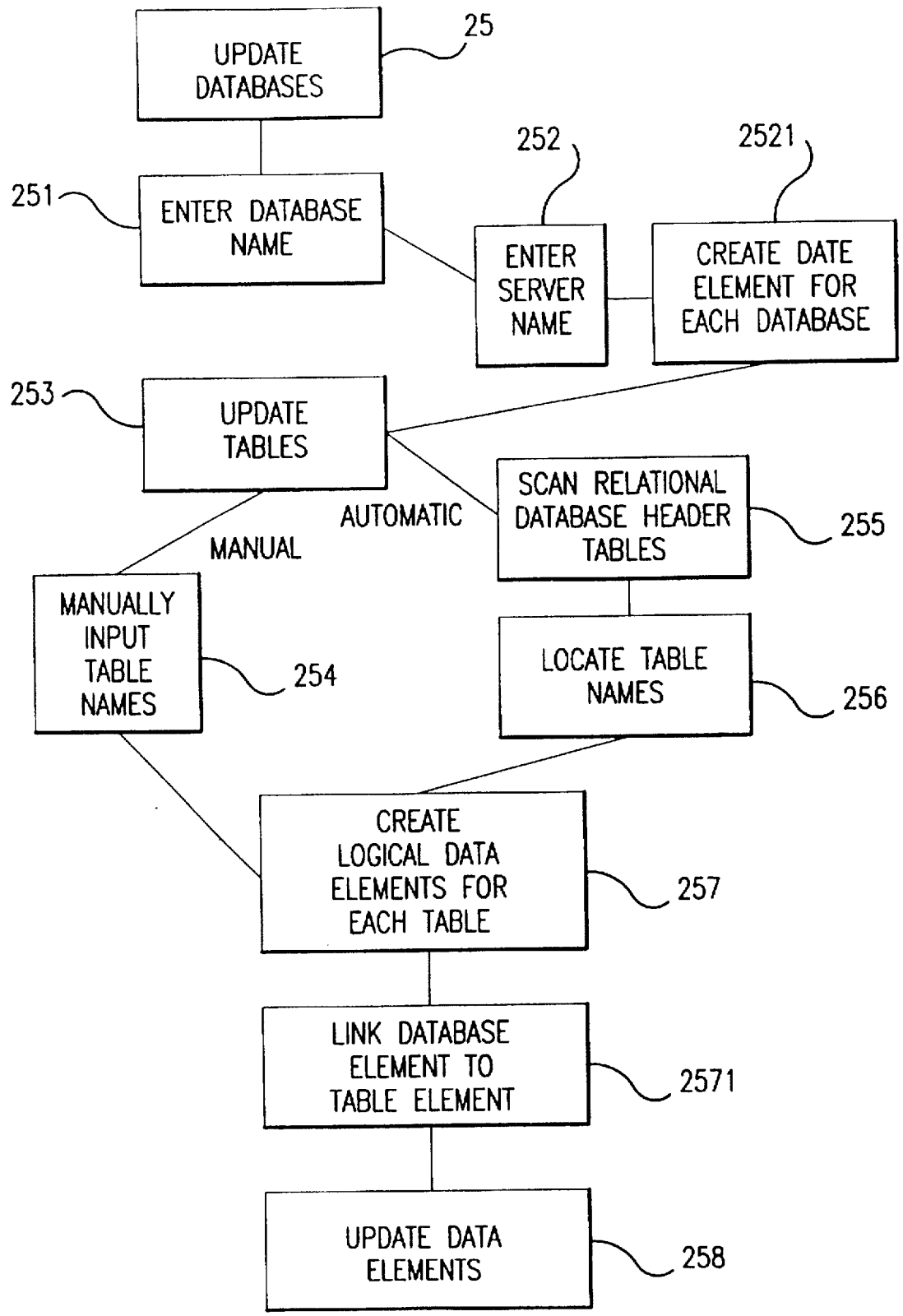
FIG. 6 is a block flow diagram depicting how the system administrator updates databases in the system.
Figure 30:
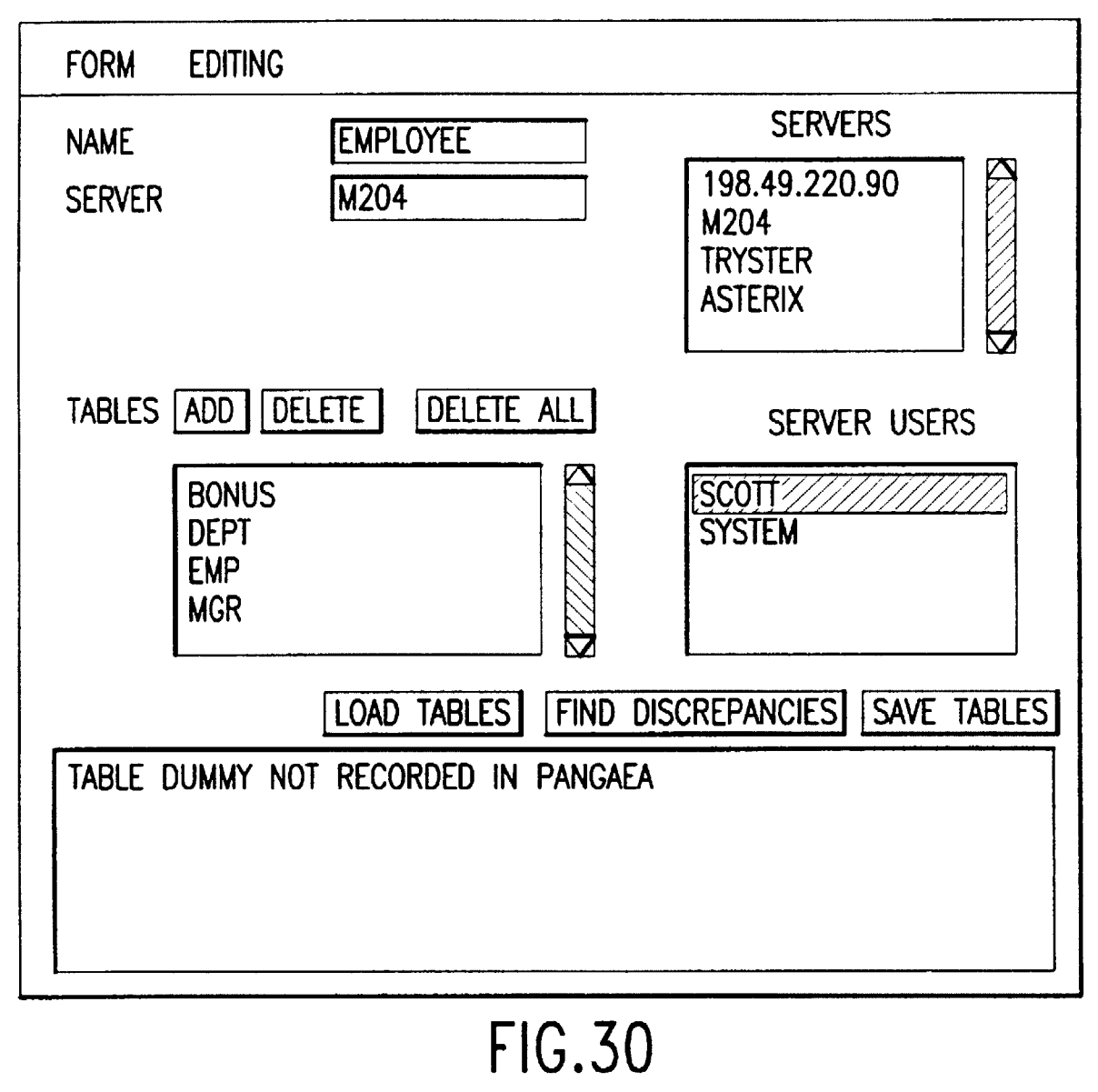

Next, as seen in block diagram in FIG. 6 and in screen form in FIG. 30, the SA must set up a database which models the existing physical databases of the legacy systems 25. To accomplish this, first the SA will type in the name of each database 251 as well as the server on which it resides 252. The system will then create a data element in the object-oriented database 2521 (not, however, in the metacatalog) for each database entered. This information need not be passed to Omni.

Figure 29:
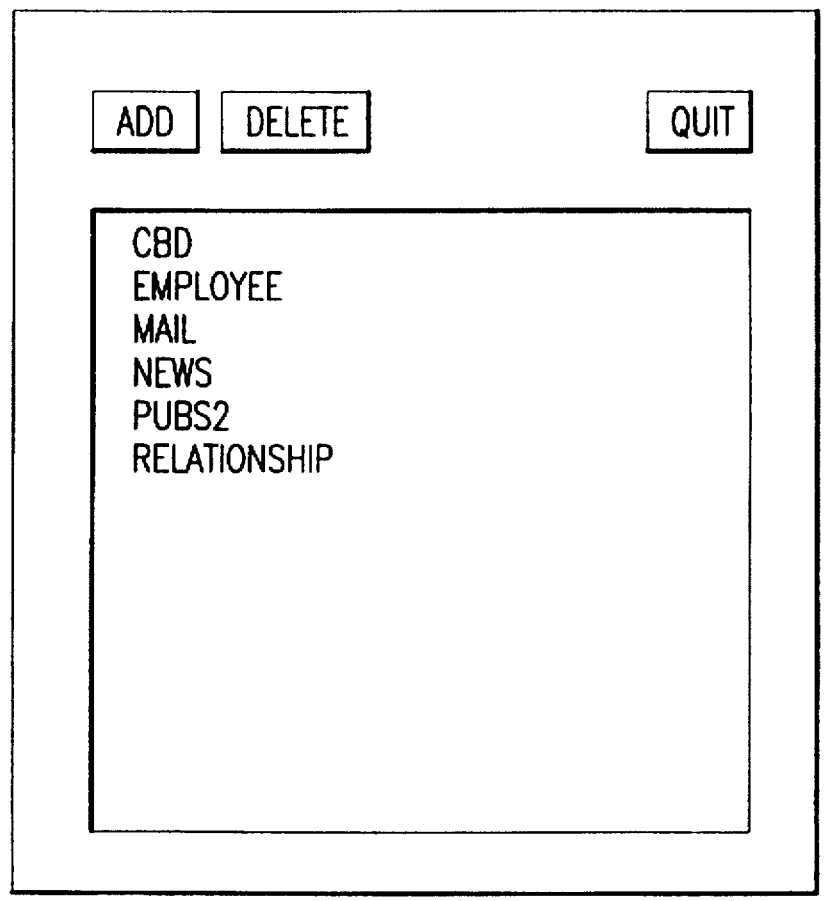
FIG. 29 is the screen that allows the system administrator to add and remove databases.

The SA may also delete databases or change information about each database by deleting the information previously entered into the database and entering new information as discussed above through the use of standard object-oriented procedures as seen in screen form in FIG. 29.

The tables of those databases will then be modeled. All information regarding the tables and physical elements of the databases in the legacy system will be stored both in the object-oriented database as well in Omni. To accomplish this task, the SA can manually input the names of the tables into the database 254 as seen in screen form in FIG. 31.

The SA can also instruct the system, through the keyboard or other input device, to model the tables automatically in the following manner. The system will scan the header tables 255 found in the relational-like tables of the legacy databases. Once the system locates the header table(s) that contain the information regarding the names of the tables in the physical databases 256, it will create a data element for each table in the object-oriented database 257 (not, however, in the metacatalog) as well as pass their information to Omni. The system will also create a pointer from the database's logical element to each logical element representing the tables in that particular database 2571.

Figure 7:
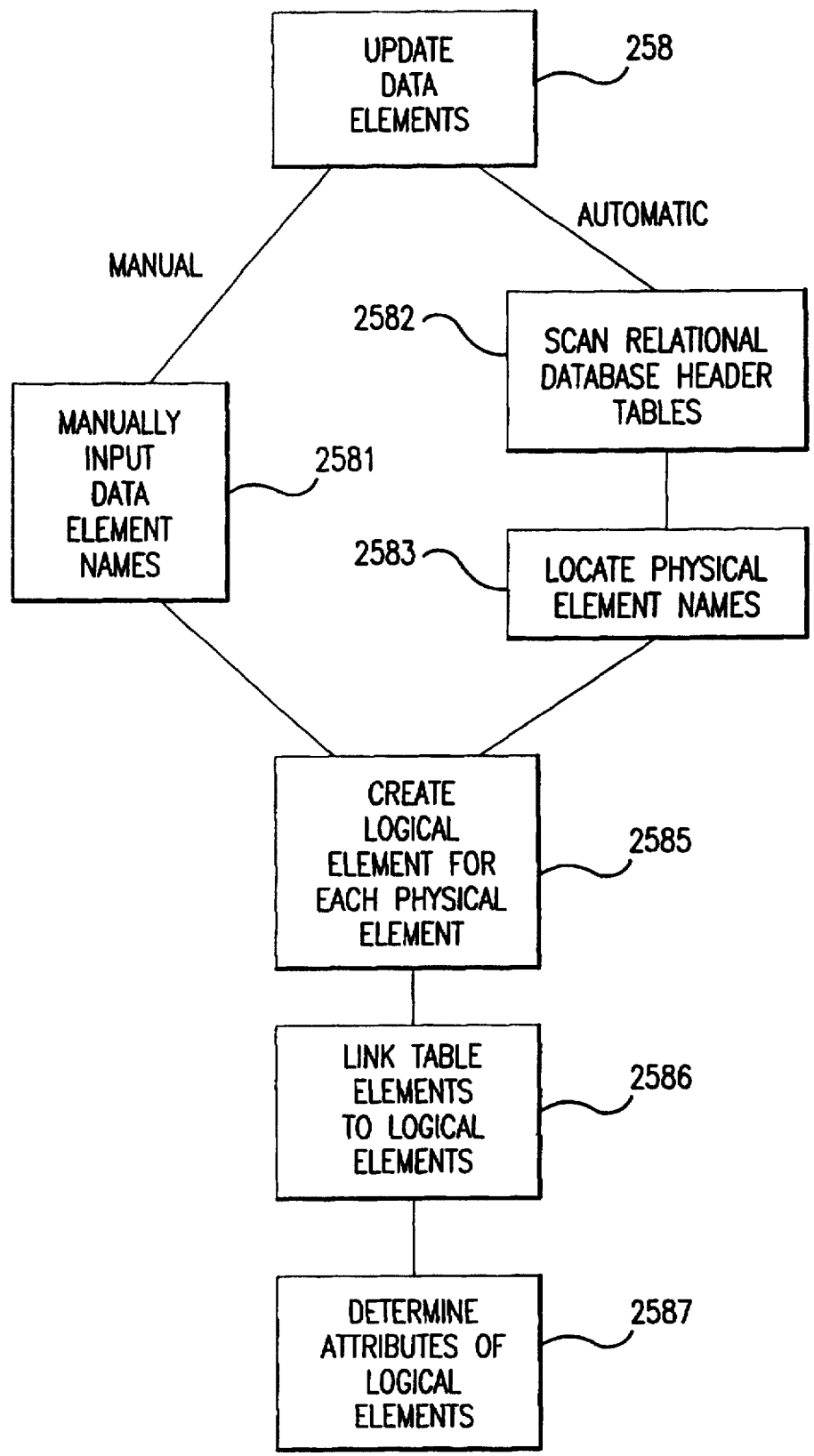
FIG. 7 is a block flow diagram depicting how the system administrator updates data elements in the system.

For each table, the physical data elements must then be modeled in the same way 258 as seen in block diagram in FIG. 7 and in screen form in FIG. 32. The SA can input those elements himself by keyboard or other input device 2581. These data elements will also be stored in an object-oriented database and Omni and in the object-oriented database 257 (not, however, in the metacatalog)

The system can also model the data elements automatically. Once again, the system will scan the relational-like tables 2582 to locate the names of the physical data elements in each tables 2583 and create a logical data element in the object-oriented databases for each physical element in the legacy systems 2585. The system will also create a pointer from the table's logical element to each logical element representing the physical elements in that particular table 2586.

Next, the attributes of each logical element must be determined 2587. Again, the SA can input the datatype and length of a physical data element such as "binary", "char" or "datetime", or the system can do this automatically surveying the header tables to determine the datatype of each physical data element as described above and use that as the datatype of the logical element to which it corresponds. Also, the system will convert the types stored in the relational-like tables to ones understood by the object-orient databases. For example, if the datatype in the relational-like table has 5 numbers followed by a decimal point and then 2 numbers, the system will record the datatype as currency.

Figure 8:
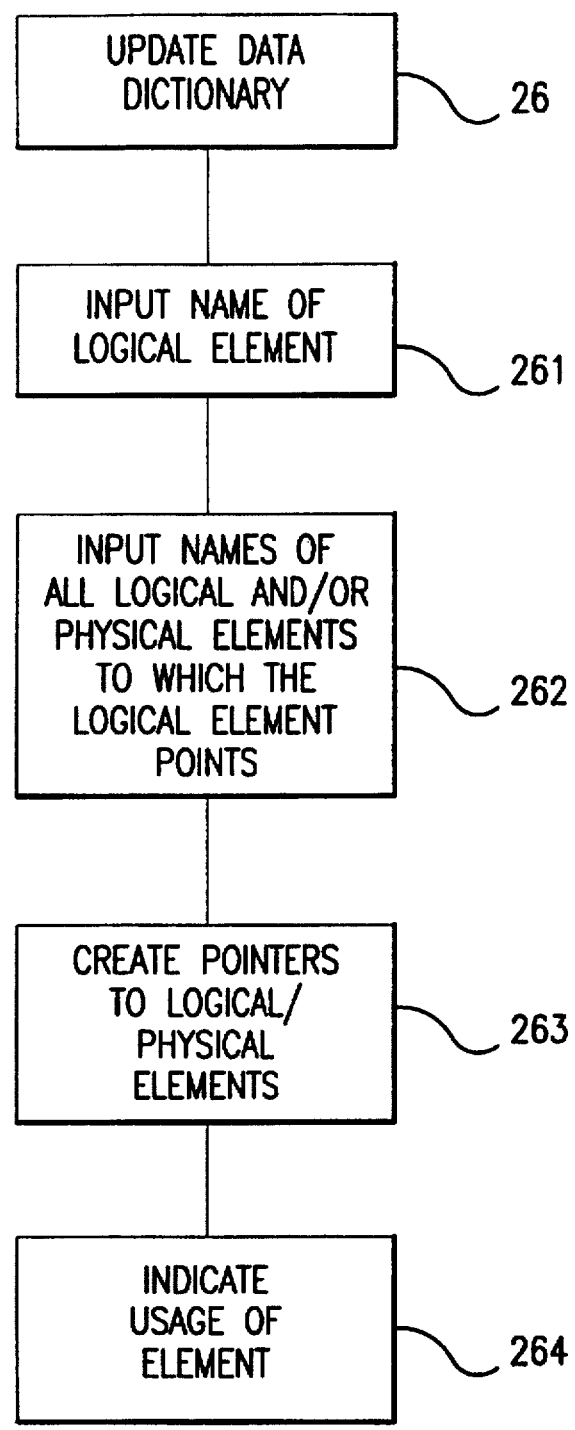
FIG. 8 is a block flow diagram depicting how the system administrator updates the data dictionary in the system.
Figure 34:
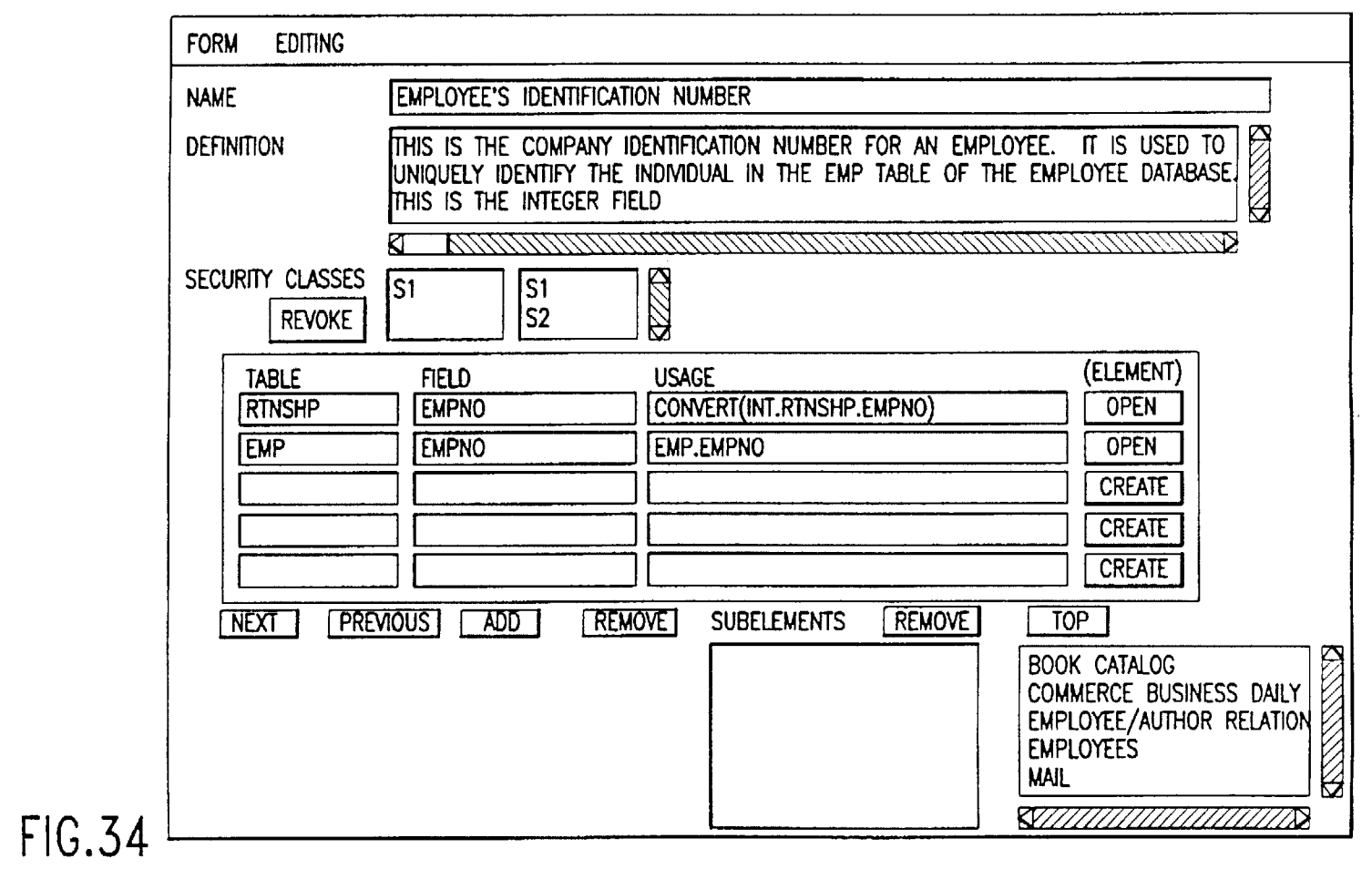

As seen in block diagram in FIG. 8 and in screen form in FIG. 34, the SA must also set up the appropriate logical data elements and links in the metacatalog so that the user may easily find and locate data. This information will only be stored in the object-oriented database and not in Omni.

To accomplish this task, the SA will first type in the name of a logical data element 261. Next, the SA will input the names of the logical and/or physical data elements to which that logical element points 262 and create pointers to those already defined physical or logical data elements 263 as also seen in screen form in FIG. 35. For example, the SA could create a logical data element called "Author's Name". This physical elements to which "Author's Name" points can be stored in many different databases on different servers (i.e. the author's name may fall in a library database that keeps track of all books and accompanying author information, as well as a magazine database that keeps track of all employees working for a given magazine). So the SA may set up a pointer using standard object-oriented database procedures between the logical element "Author's Name" and the physical elements which store the author's name in both the library and magazine databases. This information is stored in the metacatalog database and may be accessed as described below in the user section of the description.

The SA will continue to enter new logical data elements and indicate the physical elements to which each points. Logical elements entered by the SA may also point to other logical elements. For example, the SA may define a logical element called "Author" which not only points to the "Author's Name" logical element, but also points to the logical elements "Author's Address" and "Author's SSN" where each of these logical elements points to one or more other physical and/or logical elements as described above.

The SA can also indicate the usage of each logical data element 264. For example, if "Author's SSN" in the magazine database is stored in characters, and the library database physical element containing the "Author's SSN" is stored in numbers, the SA may indicate by typing the appropriate keys on the keyboard or other input device that each time the "Author's SSN" in the magazine database is used, it should be converted to numbers.

Figure 8A:
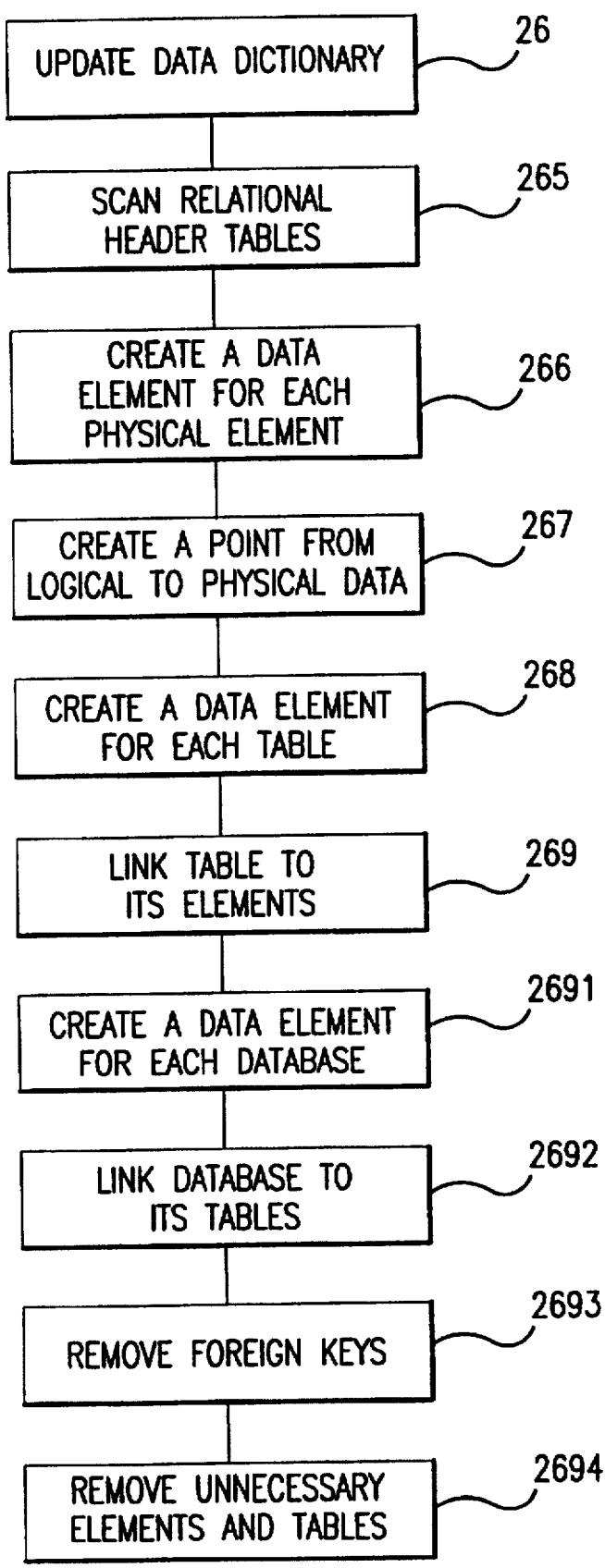
FIG. 8a is a block flow diagram depicting how the system automatically updates the data dictionary.

The system, however, can also automatically create the data dictionary at the same time that it models the databases, tables and physical elements of the legacy system above as seen in block diagram in FIG. 8a. To do this, the system will scan the header tables 265 the system will create a logical element in the metacatalog each time it models a physical element 266, and create a pointer from the logical element to the physical element 267. It will also create another logical data element in the metacatalog each time it models a table in the legacy system 268 and create pointers from that logical element to all logical elements that represent physical elements in that table, and likewise will create a pointer for each database modeled 2691 and will add pointers from the database element to the table elements 2692.

Next, the system will remove unnecessary foreign keys found in relational tables 2693 by deleting any data elements that are foreign keys in other tables after placing the appropriate pointers in the tables to which each foreign key points.

As a simple example, assume a legacy system had three tables, one called CAR with physical elements ID and MODEL, one called DRIVER with elements SSN and NAME, and one called CAR/DRIVER with physical elements ID and SSN which are foreign keys into the CAR and DRIVER tables respectively and the element DATE.

The system will first set up three logical data elements, one for each of the tables. Then it will set up seven logical elements, one for each of the physical data elements in those tables and then create pointers between the logical elements for the tables, and the logical elements for the physical elements. Last, it will create pointers from the latter set of logical elements to their respective physical elements. It can look like the following:

LOGICAL　　　　　PHYSICAL

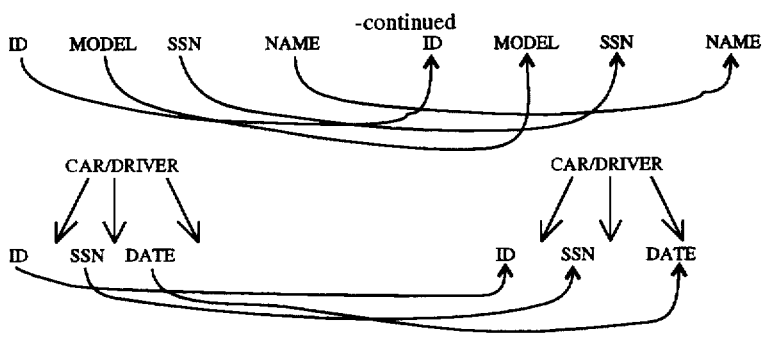

If, however, the system finds, by looking at the header tables that a physical element is a foreign key, it will move the pointer to the actual physical element as can be seen below.

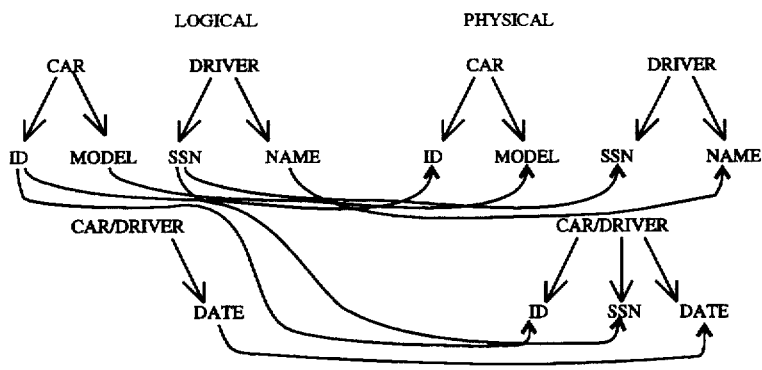

If the table is made of only foreign keys, it will be removed from the system. Likewise, any fields no longer in use will be removed 2694.

Figure 33:
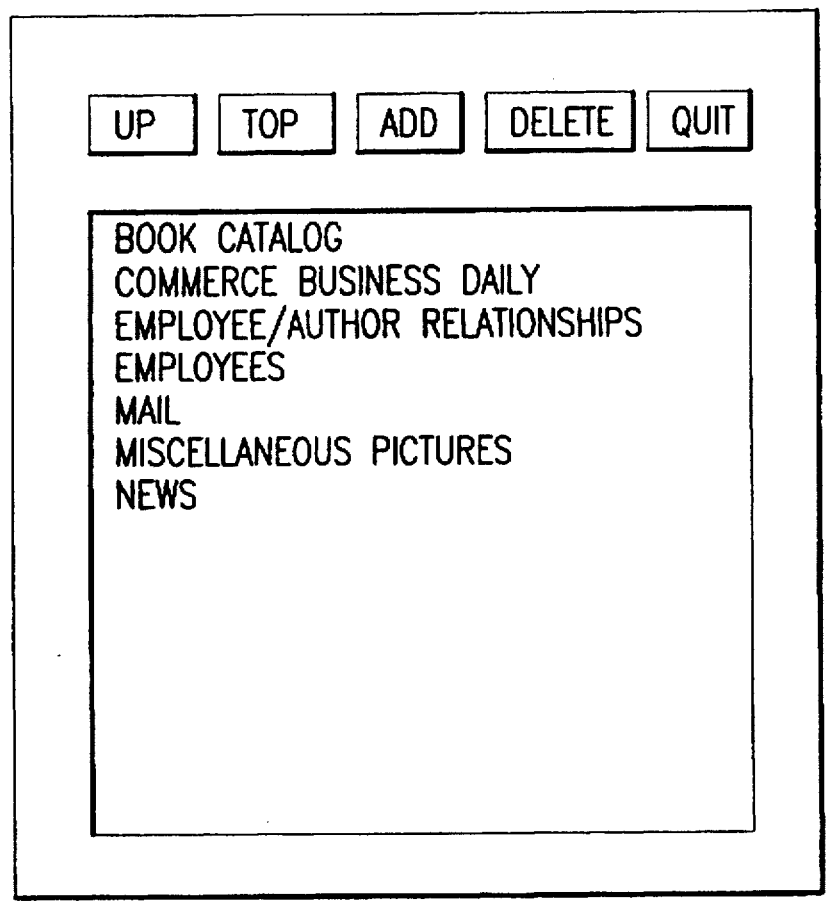
FIG. 33 is the screen that allows the system administrator to add or remove data dictionary elements from the metacatalog.

The SA may at any time log on to the system and add, delete or update any of the logical data elements and links that were previously entered using standard access and retrieval means in object-oriented databases as seen in screen form in FIG. 33.

USER FUNCTIONS

Figure 9:
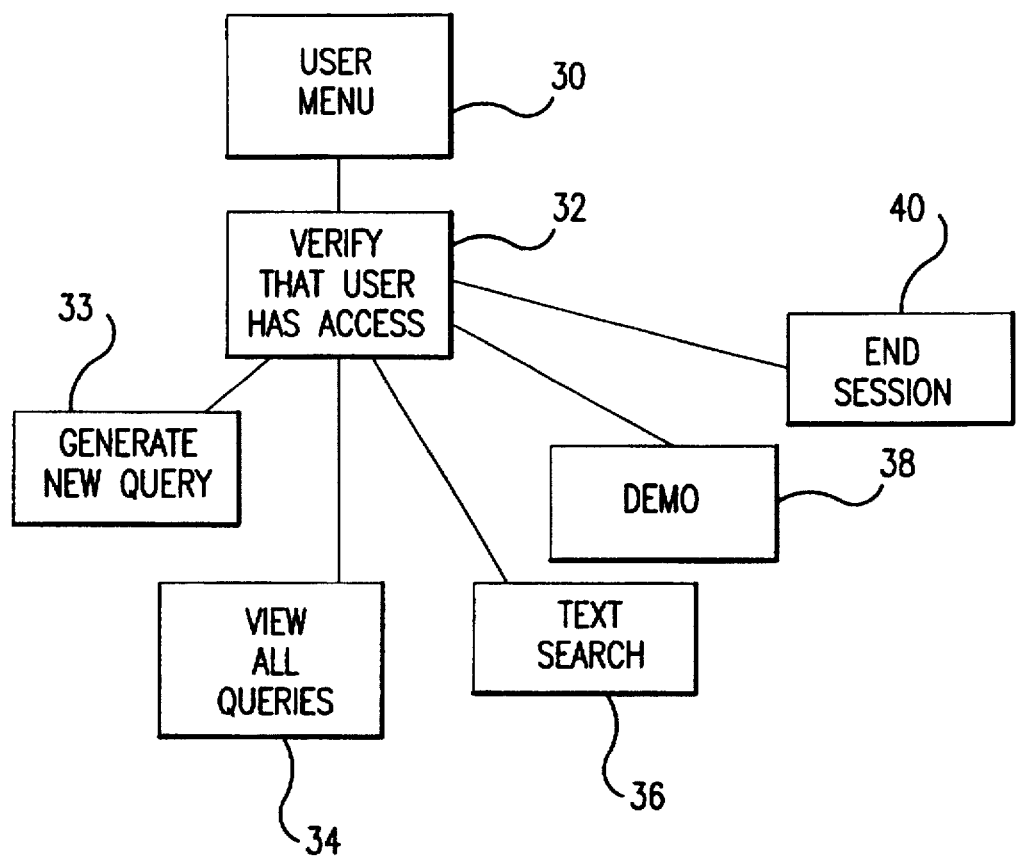
FIG. 9 is a block flow diagram of the user menu.

As seen in FIG. 9, once the SA has initialized the system, a user may now use the system through the user menu 30 in the following manner.

The system will first verify that the user has access to the system by comparing the user's identification with pre-stored information in the system 32.

Figure 16:
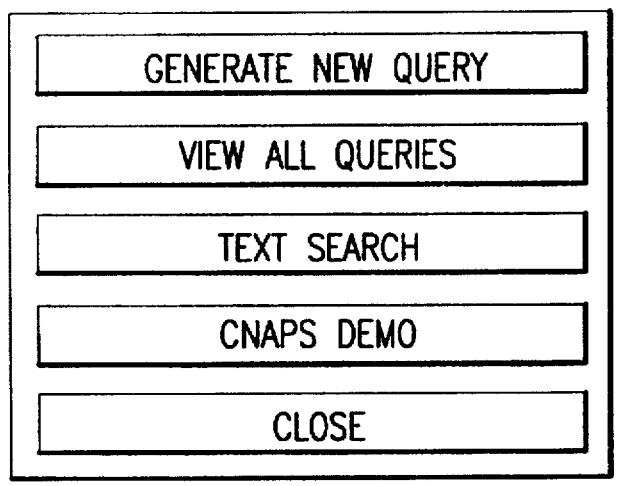
FIG. 16 is the user menu screen for the system.

Once it is determined that the user has access to the system, he may choose to either generate a query 33, view all queries 34, do a text search 36, demonstrate the system 38 or end the session on the system 40 as may be seen in screen form in FIG. 16. Each of these options will be more fully described below.

Figure 10:
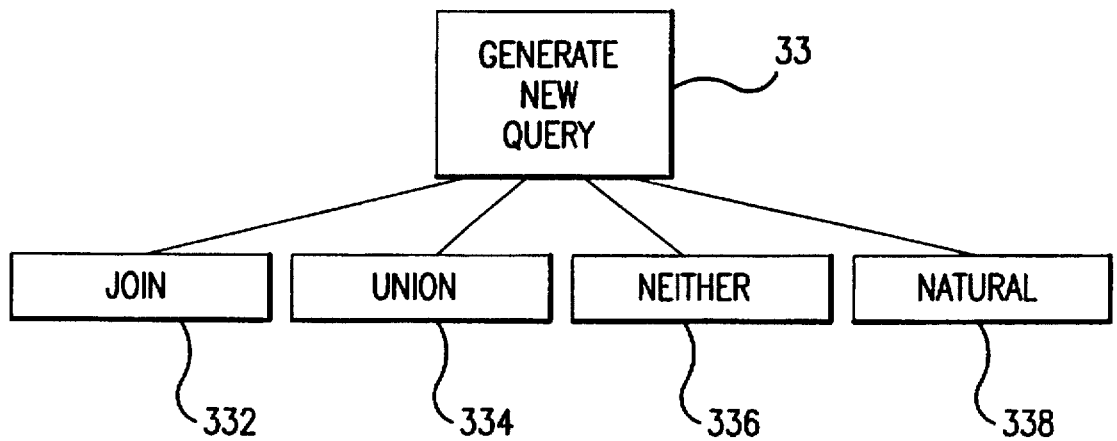
FIG. 10 is a block flow diagram of the choices the user has when generating a new query.
Figure 17:
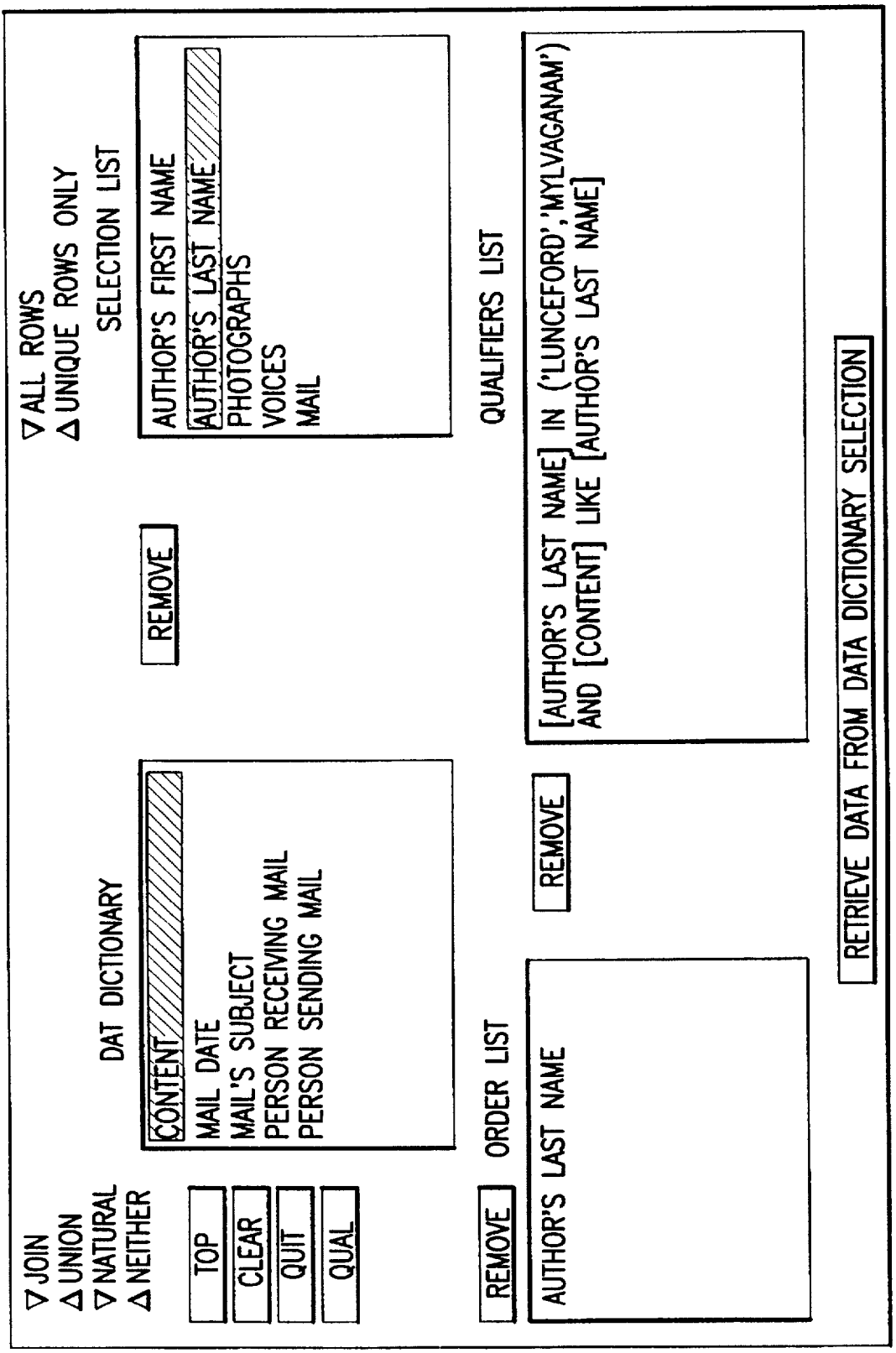
FIG. 17 is the user screen to generate a new query.
Figure 19:
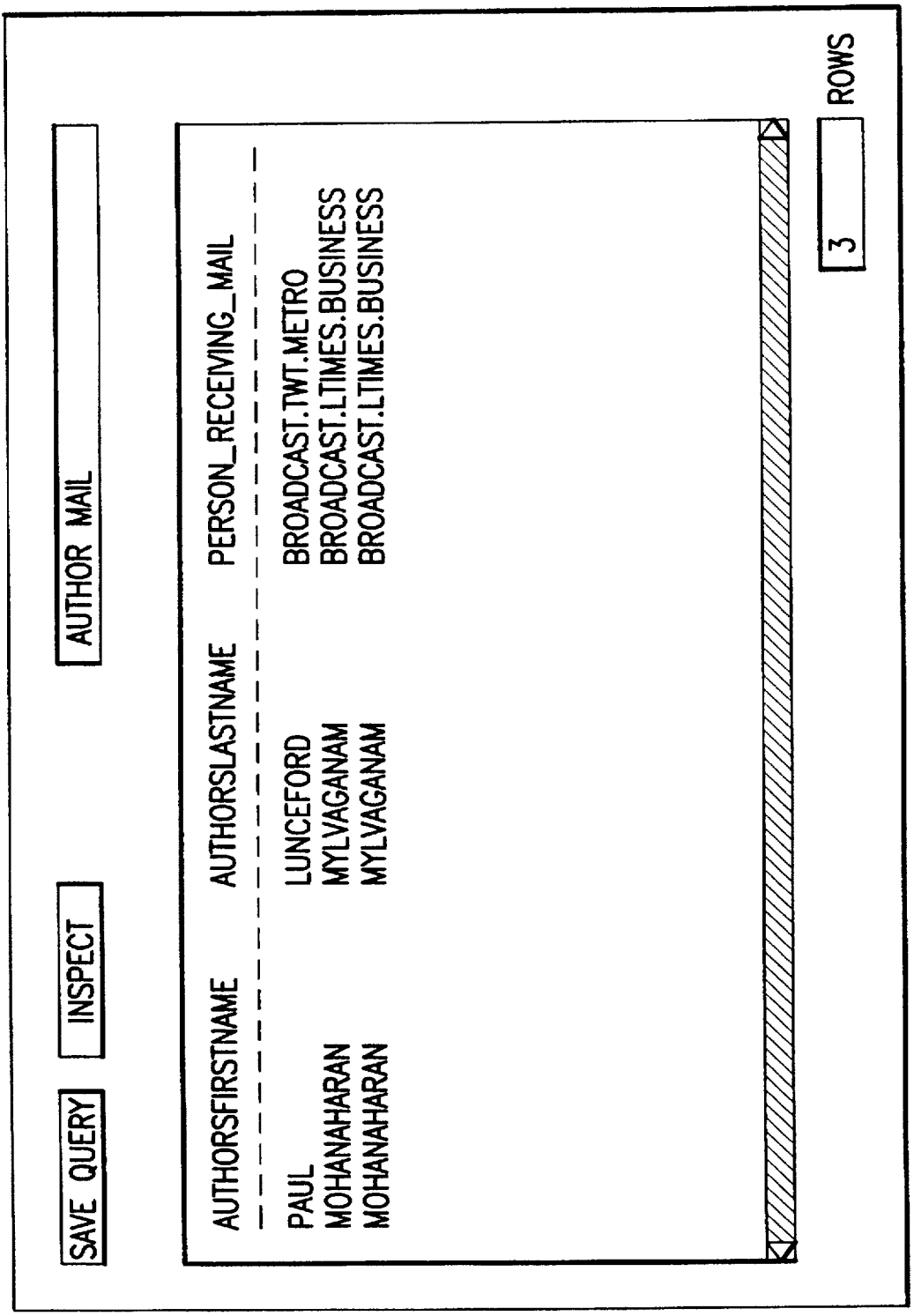
FIG. 19 is the main results screen which displays the results of a query.

As seen in block diagram form in FIG. 10 and in screen form in FIG. 17, to generate a new query, the user indicates by keystroke or input device which of the following types of queries he would like to perform: "Join" 332, "Union" 334, "Neither" 336 or "Natural" 338 each of which will be explained in detail below. Each query which may be saved, viewed and used later will be more fully explained below.

The description below for each type of query will explain how a unique SQL string will be created. Each new query will yield a new SQL string which will then be passed on to a database management COTS product such as Omni or EDASQL which will run the query and return the proper data responsive to that query.

Figure 11:
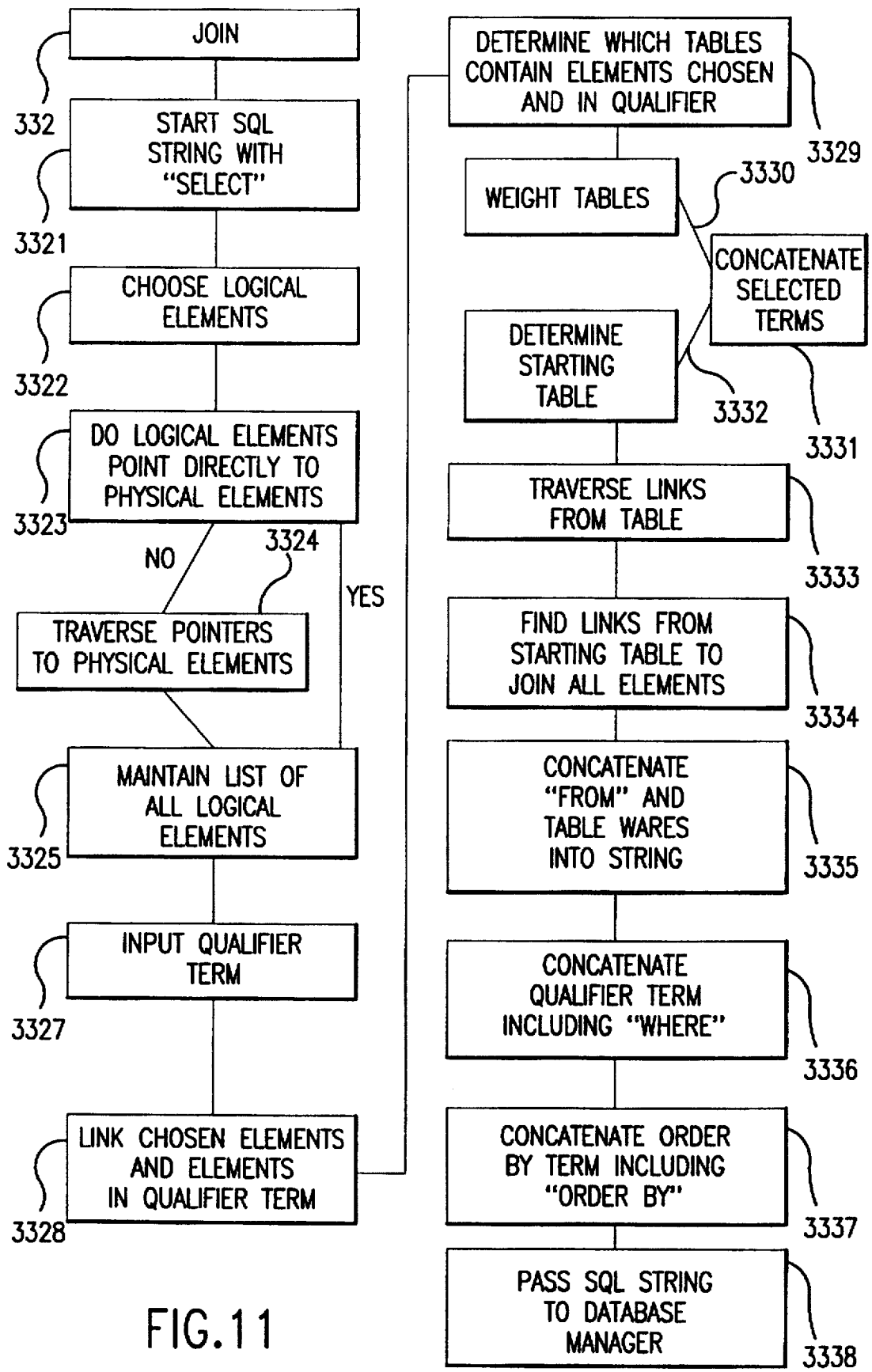
FIG. 11 is a block flow diagram showing how the user creates a "Join" query on the system.

As seen in FIG. 11, if the user selects "Join", an SQL statement which logically links the selected data elements will be created in the following manner. The system will start the SQL string by automatically concatenating the word "SELECT" onto the SQL string 3321.

The user will first be instructed by the system to choose the logical data elements that he would like to join 3322. This selection can be made from a list of data elements provided on the screen, or the user can input the elements himself by entering the appropriate keystrokes. If the user types in the elements himself, the system will then verify that the typed data element exists in the database by comparing the name of the entered data element to the list of logical data elements that were defined by the SA and stored in the metacatalog. Otherwise, if the typed data element is not found, the system will exhibit an error message and the user will be instructed to either try again or choose a logical data element from the listed elements. The chosen elements can either point directly to one or more physical elements and/or they can point to one or more logical elements.

If the user selects one or more data elements that do not point directly to physical elements 3323, the system will traverse all links set up by the system administrator 3324 from the chosen data elements until it reaches the lowest level in which only physical elements are pointed to. All logical elements in this lowest level will be stored for later use 3325.

Figure 18:
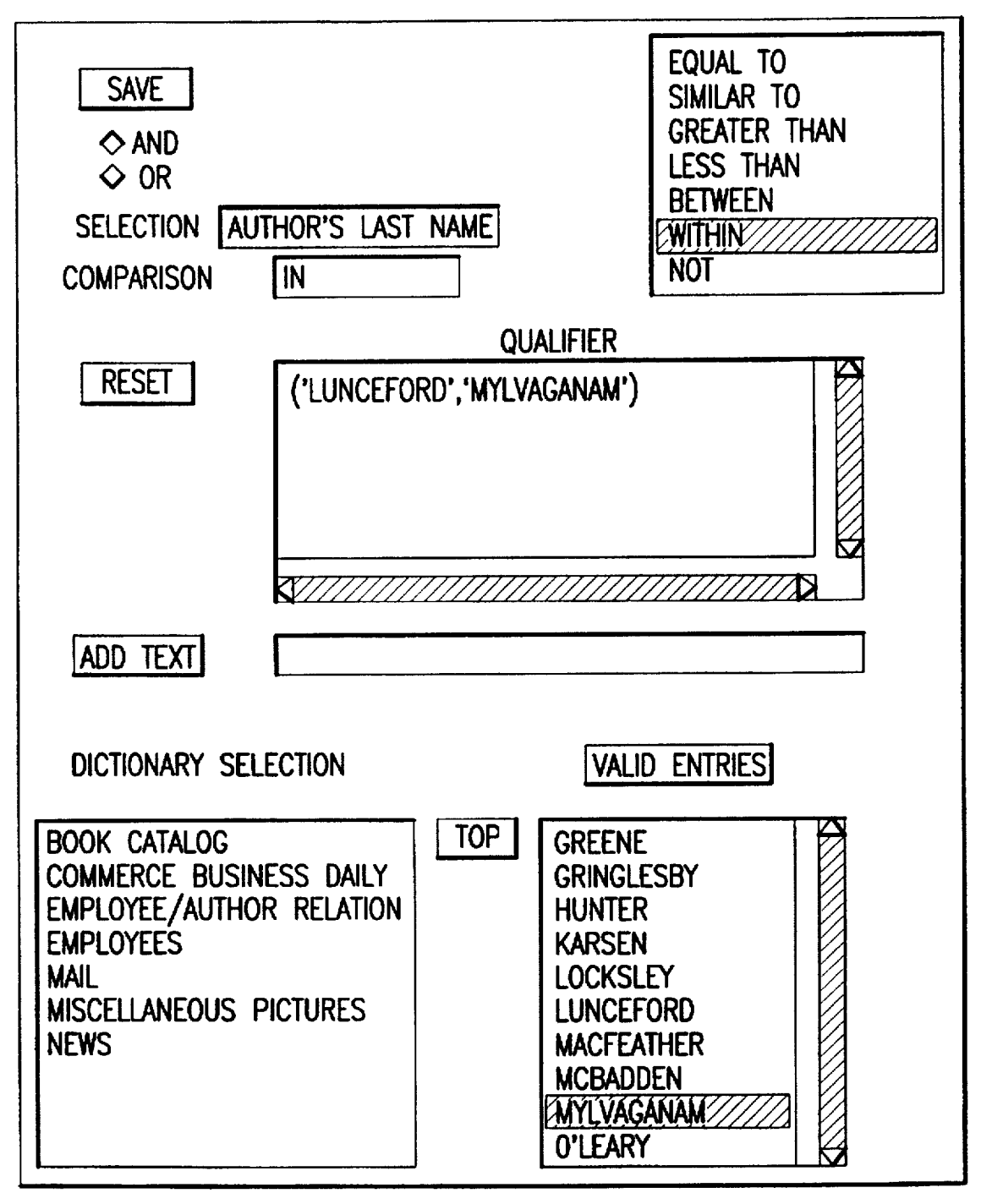

Once all low-level logical elements are determined, the user is instructed by the system to indicate if any qualifiers should be placed on the query as seen in screen form in FIG. 18. Once again the user can input the qualifier himself 3327 and the system will verify that the proper syntax and elements have been entered by comparing the entered data to the allowable syntax of an SQL statement, or to make it easier for the user, the user can select the data elements that will be used in the qualifier from the provided list as well as the operators that can be used such as: "greater than", "less than" or "between". In this way, the user can enter qualifiers without having to type many keystrokes, thereby, making the system easier to use and quicker to operate.

Next the system must determine the appropriate links to carry out the "Join" as specified by the user 3328. To do this, the system examines all the low-level logical elements chosen as well as low-level logical elements in the qualifier point, and makes a list of all the tables to which those logical data elements point 3329.

The tables are then weighted 3330 to determine which table has the most data elements stored therein. To accomplish this task, each table is given a weighting score for each logical data element that points to that table. All logical elements that are part of the elements chosen (as opposed to the qualifier) that point to the table with the highest score are concentrated onto the SQL string with the appropriate table names 3331. For example, if elements abc and def are found in tableA which has the most points, the SQL string can look like the following "SELECT tableA.abc, tableA.def". The name of that table is put into a list of "Tables To Be Joined".

For each logical data element 3334 found in that table, the system records that the data element has been found. The system then reweights the remaining tables and repeats this action until all elements are found.

Next, the "Tables To Be Joined" must be linked in the following manner. The system starts by removing one table from the list of "Tables To Be Joined" and placing it in the "Tables Joined" list. This table is called the starting table 3332.

Next, the system looks at the metacatalog to find which other tables share in the starting table. These other tables are said to be directly linked to the starting table 3333.

All tables that are directly linked to the starting table are located. If any of the tables located are in the list of "Tables To Be Joined", the table is removed from the list of "Tables To Be Joined" and placed in the list of "Tables Joined". The link between the starting table and the located table is noted in the "Tables Joined" list.

If no table linked to the starting table is found in the list of "Tables To Be Joined", or at least one table in the list of "Tables To Be Joined" remains, the process repeats by examining the links to all found tables.

Accordingly, each of the linked tables is then examined to determine the tables to which it directly links. If any of the tables to which it links are in the list of "Tables To Be Joined", that table, as well as the table to which it is linked, is placed in the list of "Joined Tables" 3334. No table can appear simultaneously in both the list of "Joined Tables" and the list of "Tables To Be Joined". Accordingly, if a table is placed in the list of "Joined Tables", it is removed from the list of "Tables To Be Joined".

This process is repeated until all tables in the list of "Tables To Be Joined" are linked together or all tables have been traversed and no link is found. Next, the list of "Tables Joined" is concatenated onto the SQL string after concatenating the word "FROM" to that same string 3335.

The SQL statement now contains the entire select clause and can look like the following: "SELECT tablea.abc, tableB.def, tablea.efg FROM tableA, tableB" Now the qualifier term must be concatenated onto the string. The qualifier list is made up not only of the qualifiers selected by the user, but also the links found between the tables.

If no qualifiers exist, the qualifier portion of the string is omitted. However, in most joins, the qualifier portion is a major part of the string. The qualifier term is always preceded by the word "WHERE" which is concatenated onto the existing SQL string 3336.

To complete the qualifier term, previously recorded links between tables with appropriate punctuation are concatenated onto the SQL string.

For example, if element abc in tableA is linked to element def in tableB, the following will be concatenated onto the SQL string: "tableA.abc–tableB.def". The word "AND" is placed between every qualifier.

Additionally for all elements that the user identified as qualifiers, the physical location and limitations are concatenated onto the SQL string. So if the user wanted only to see the records where element abc was greater than 100, the following will be concatenated onto the SQL string: "tableA.abc>100".

Now the string contains all elements to be joined as well as all qualifiers. It can look something like the following: "SELECT tableA.abc, tableB.def, tableA.efg FROM tableA, tableB WHERE tableA.abc–tableB.def AND tableA.abc>100".

Last, the user is given the option of specifying the order in which he would like the results returned from the SQL string. If there is no specified order, the order term can be entirely omitted. The order term starts with the words "ORDER BY" which are concatenated onto the SQL string 3337.

The user then selects which terms to order by from the list of data elements previously selected as join terms. All logical data elements chosen for the join, or any subset thereof, can be used as order terms. Accordingly, given the sample SQL statement above, between 0 and 3 terms can be chosen as order terms. They will be placed in the SQL string in the order chosen with appropriate punctuation therebetween.

The completed SQL string can look like the following: "SELECT tableA.abc, tableB.def, table*A.efg FROM tableA, tableB WHERE tableA.abc–tableB.def AND tableA.abc >100 ORDER BY tableA.abc, tableB.def". It will then be passed to a database manager such as Omni or EDASQL for retrieval of the data 3338, and results will be returned as seen in screen form in FIG. 19.

Figure 12:
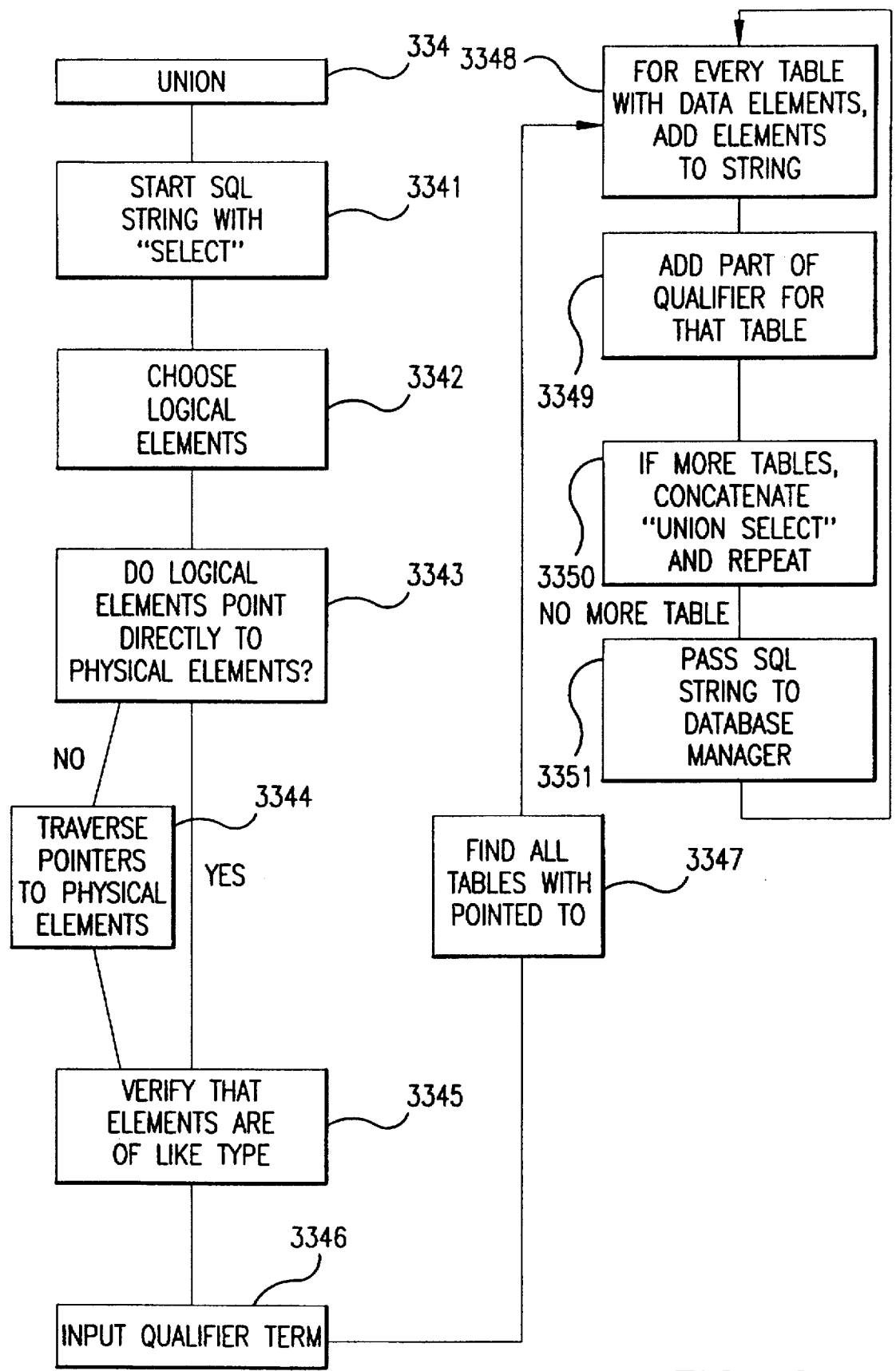
FIG. 12 is a block flow diagram depicting how the user creates a "Union" query on the system.

As seen in FIG. 12, if the user selects "Union" 334, the system will start the SOL string with the word "SELECT" 3341. The user will first be instructed to choose the logical data elements that he would like to union 3342. This selection can be made from a list of data elements and displayed on the screen, or the user can input the elements himself. If the user types in the elements himself, the system will verify that the typed logical data elements exist as described above, otherwise if the typed data elements do not exist, the system will exhibit an error message and the user will be instructed to either try again or choose a data element from the listed elements. The chosen elements can either point directly to one or more physical elements and/or they can point to one or more logical elements 3343.

If the user selects one or more data elements that do not point directly to physical elements, the system will traverse all links set up by the system administrator 3344 from the chosen data elements until it reaches a level in which only physical elements are pointed to.

Because unions may only be performed on like data (i.e., all numeric, all characters) the system will first verify that all chosen logical data elements are of like type 3345. If they are not, an error message will be displayed.

The user is then asked to indicate if any qualifiers 3346 should be placed on the query. Once again, the user can input the qualifier himself and the system will verify that the proper syntax and elements have been entered according to standard SQL language, or to make it easier for the user, the user can select the data elements that will be used in the qualifier from the provided list as well as the operators that can be used such as: "greater than" "less than" "between" or "similar to". In this way, the user can enter qualifiers without having to type many keystrokes, thereby, making the system both easier to use and quicker to operate.

Next, the system will find all tables that are pointed to by either the chosen data elements or the qualifier terms 3347. For every table pointed to, the system will concatenate the data elements chosen onto the SQL string with the appropriate table names 3348, followed by the any qualifier terms that access that table 3349. If there were more tables, the system would concatenate the words "UNION SELECT" onto the SQL string 3350 and repeat the above until all tables were processed.

For example, if the user would like to union elements abc and def, and if abc was stored in tablea and tableB and def was stored in tableC and the user only wanted to see values where def>100, the SQL string can look like the following: "SELECT tablea.abc FROM tableA UNION SELECT tableB.abc FROM tableB UNION SELECT tableC.def from tableC WHERE tableC.def>100".

Last, SQL string would be passed to a database manager such as Omni or EDASQL for retrieval of the data 3351 and return the results as shown above.

Figure 13:
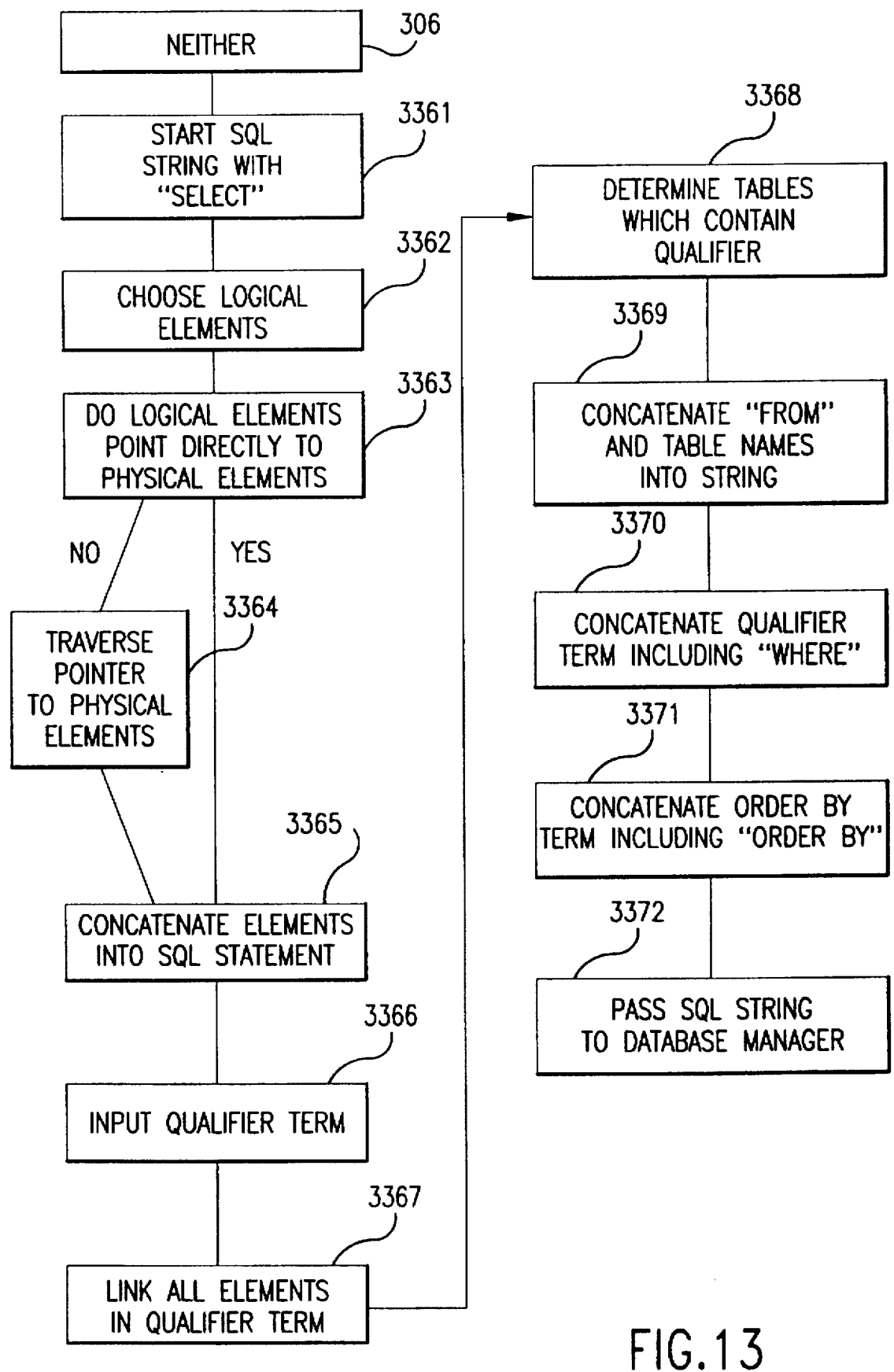
FIG. 13 is a block flow diagram depicting how the user creates a "Neither" query on the system.

As seen in FIG. 13, if the user selects "Neither" 336, the system will start the SQL string with the word "SELECT" 3361. The user will first be instructed to choose the logical data elements that he would like to work with 3362. This selection can be made from a list of logical data elements displayed on the screen, or the user can input the elements himself. If the user types in the elements himself, the system will verify that the typed data element exists as described above, otherwise if the typed data elements do not exist, the system will exhibit an error message and the user will be instructed to either try again or choose a data element from the listed elements. The chosen elements can either point directly to one or more physical elements and/or they can point to one or more logical elements.

If the user selects one or more data elements that do not point directly to physical elements 3363, the system will traverse all links set up by the system administrator from the chosen data elements until it reaches a level in which only physical elements are pointed to 3364.

The names of all of the data elements will be concatenated onto the SQL string following their appropriate table names, as described above in the "Join" 3365.

The rest of the string will be processed as the "Join" above 3366–3371, except that the data elements chosen by the user will not be linked as in the "Join", only the terms in the qualifiers will be linked. Last, the SQL string will be passed to a database manager such as Omni or EDASQL for retrieval of the data 3372 and return the results as shown above.

All queries above will return all data found in the database even if it is redundant. To retrieve only UNIQUE rows, the word "UNIQUE" should simply be concatenated into the SQL string after the word "SELECT".

Figure 14:
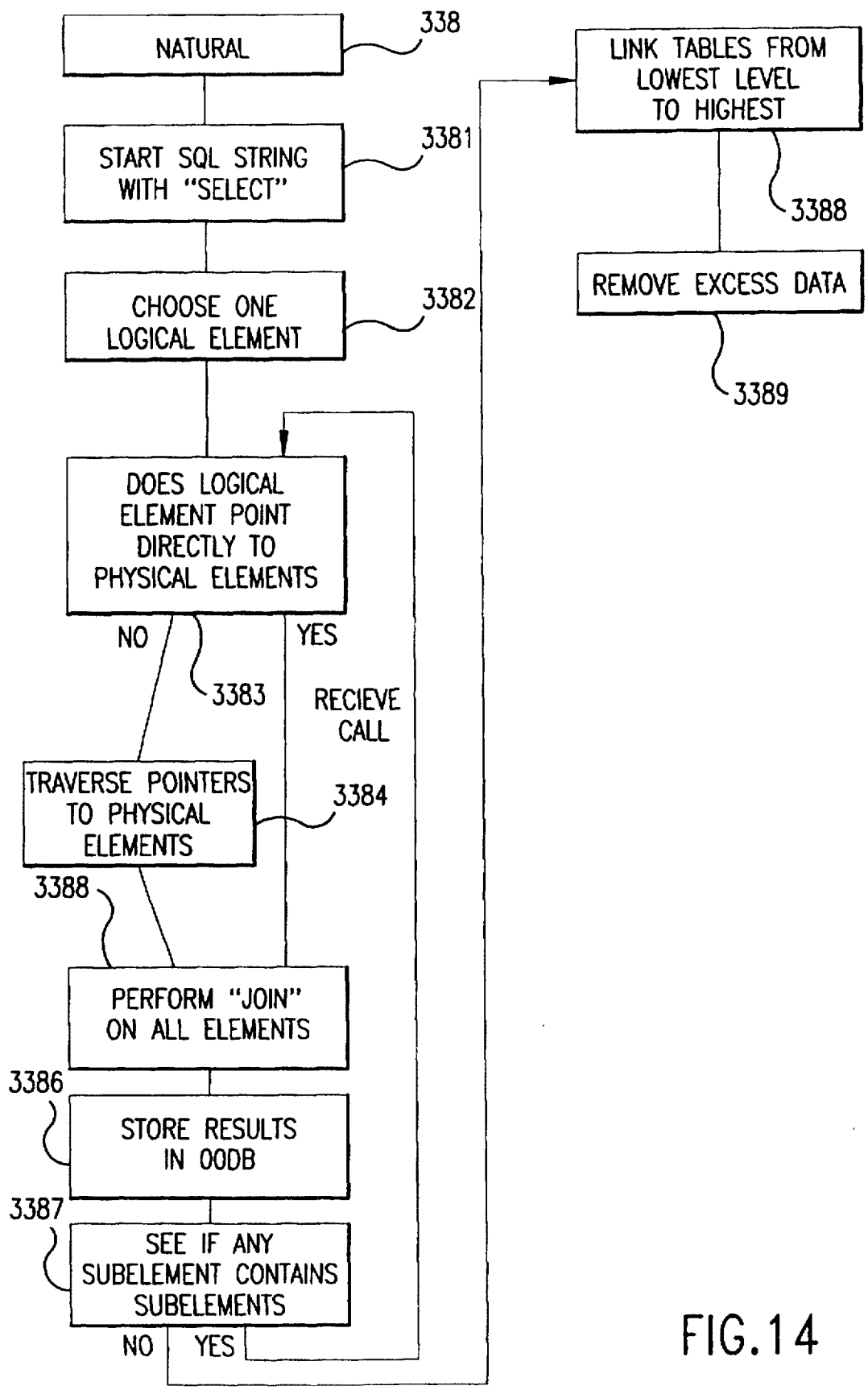
FIG. 14 is a block flow diagram depicting how the user creates a "Natural" query on the system.

As seen in FIG. 14, if the user selects "Natural" 338, the system will start the SQL string with the word "SELECT" 3381. The user will first be instructed to choose a single logical data element that he would like to examine 3382. This selection can be made from a list of data elements and displayed on the screen, or the user can input the element himself. If the user types in the element himself, the system will verify that the typed data element exists as described above, otherwise if the data element does not exist, the system will exhibit an error message and the user will be instructed to either try again or choose a data element from the listed elements. The chosen element can either point directly to one or more physical elements and/or can point to one or more logical elements.

If the user selects a data element that does not point directly to physical elements 3383, the system will traverse all links set up by the system administrator from the chosen data element until it reaches a level in which only physical elements are pointed to 3384.

Next, the system will perform a join operation on these chosen elements and qualifiers 3385. The results of which will be stored in the object-oriented database 3386.

Next, the system will recursively perform the same operation on every sub-element of the chosen elements that have other sub-elements (logical elements) beneath them 3387. These results will also be stored in the object-oriented database.

Next, the system will complete the recursive procedure by placing double links between the results, starting at the lowest level and working upwards towards the saved results of the first query wherever two fields contain the same information 3388. After all links are created, the data in the upper level of any link is removed 3389.

For example, if the user sought to perform a "Natural" operation on the logical element "Employee-Author-Relationship"—which contained three sub-elements, "Employee", "Author" and "Relationship", and "Relationship" pointed directly to a physical data element, while "Employee" and "Author" each had one sub-element, "Employee Name" and "Author Name" respectively, wherein each of those point directly to a physical data element.

The system would do a "Join" query on those terms and could return the following table

| Employee Name | Author Name | Relationship |
|---|---|---|
| Clark | Smith | Friend |
| King | Smith | Cousin |
| Jones | Jones | Spouse |

Next the system would start again with each sub-element that contained logical elements so it would perform the same operation on both "Employee" and "Author" and could return the following.

| Employee Name | Author Name |
|---|---|
| Clark | White |
| Adams | Allen |
| King | Smith |
| Jones | Jones |
| Anderson | |

The tables would then be linked starting at the bottom level.

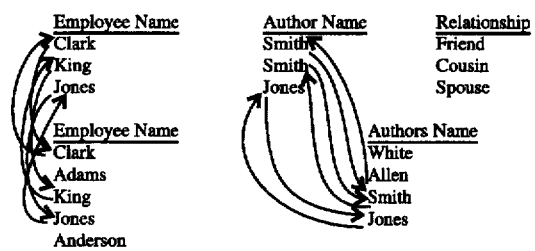

All unnecessary entries in the lower tables will be dropped and all elements in the upper tables that have pointers will be dropped, yielding the following:

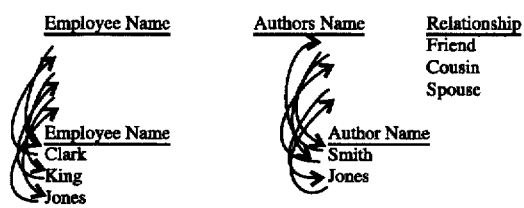

Any duplicate rows will be removed. This will give the user the ability to traverse through the data easily.

The system can also do standard full-text searches by linking to a COTS product such as Texis to carry out that function and returning the text in a screen that resembles FIG. 21 in the following manner. If the user would like to search text for all references to data stored in a particular field on a legacy system, the system will create an appropriate query for the field in the legacy system as described above and pass it to Omni. Once the results are returned, the system will create a new query for every result row as described above and pass it to Texis which, like Omni, will return the text so the user may view it.

Figure 20:
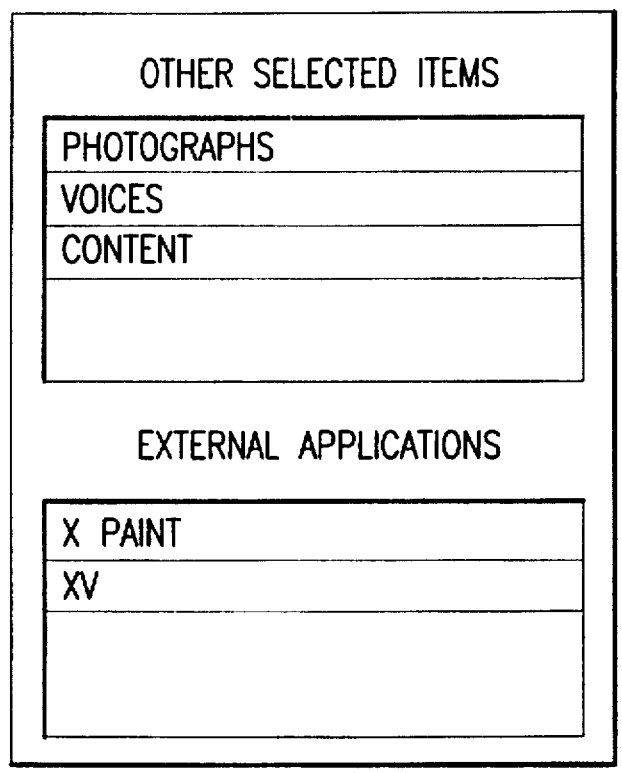

The system can also retrieve information stored in picture and audio form by taking the pointer to a picture or audio that is returned from Omni and using that pointer to retrieve that data from the files as seen in screen form in FIG. 20. The retrieved data, in audio or visual form, can actually be saved in the object-oriented database for easy access. Accordingly, the pointer to that audio or visual data can be removed.

The system also provides a demonstration mode to interactively show the user how to operate the system with instructions displaying at each stage of its operation.

Figure 22:
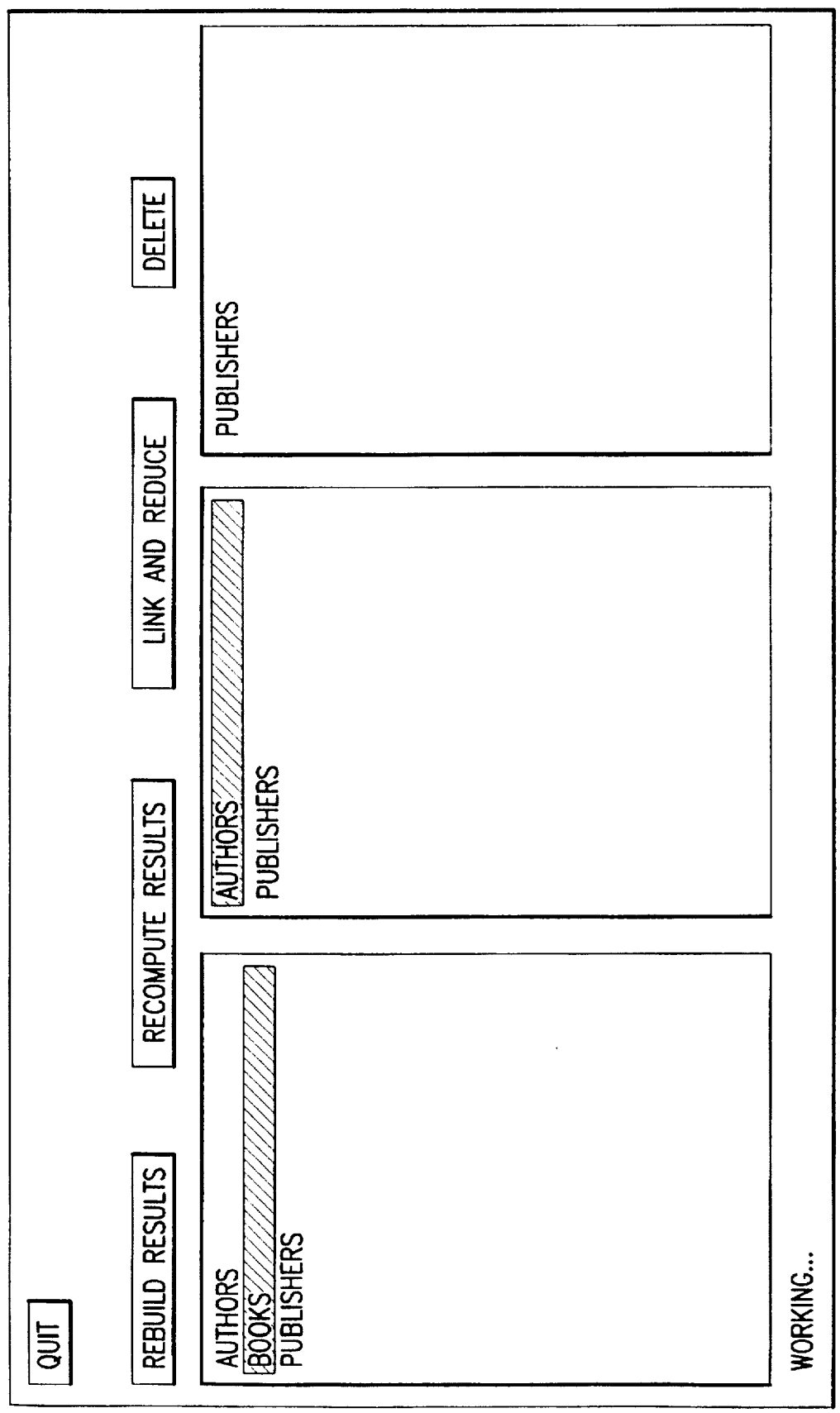
FIG. 22 is the screen which allows the user to view and redesign all queries.

As noted above, each of the above queries may be saved, viewed and reexecuted at any time as seen in screen form in FIG. 22. This is accomplished in the following manner. The user may indicate that he would like to save the results of a query. This will save the query itself, as well as the results. If any actions are performed on the data following being saved, an audit trail will be kept to track those actions.

If the user would like to rebuild the data, because for example, the data on the legacy systems has changed, the system will not only reexecute the query, but will also perform all actions on the audit trail.

Likewise, the user may choose to recompute the results which would perform the query again but would not use, and would in fact destroy, the audit trail.

This system also allows a user to manipulate the data directly in the object-oriented database as discussed in Booch. All results may be fed into compatible external applications which can manipulate the data and return it to the object-oriented database.

What is claimed is:

1. A system for integrating information from a plurality of different data structures stored in a plurality of different types of storage structures into a single-framework, the system comprising:
   (a) input means for choosing criteria on which to gather said information;
   (b) modeling means for modeling an entire problem domain which includes at least one said data structure from said plurality of different types of storage structures, including relations, hierarchical, flat file, and object-oriented database structures, at least some of the data structures including relational tables, the modeling means including means for determining which foreign keys in the relational tables are necessary, for removing unnecessary foreign keys in the relational tables, and for removing tables made only of foreign keys;
   (c) data dictionary means for tracking locations of said information across said at least one data structure in said problem domain;
   (d) statement generating means for automatically generating data requests based on said chosen criteria;
   (e) accessing means for receiving said information independent of said types of storage structures and responsive to said data requests; and
   (f) interface means for providing a uniform relational view of said problem domain that is consistent across said types of storage structures enabling said data to be manipulated without limitation as to said type of storage structure.

2. The system of claim 1, wherein each of said data structures include tables and physical data elements, and said data dictionary means includes logical data elements and pointers, and said chosen criteria comprises said logical elements, such that when such user chooses said criteria in the format of logical elements, physical data elements are retrieved.

3. The system of claim 2, further comprising means to determine the most accessed of said tables, wherein said statement generating means generates a JOIN statement to link retrieved and returned data based on said chosen logical elements and said most accessed tables and said physical data elements.

4. The system of claim 2, wherein said statement generating means generates a UNION statement to retrieve and return data responsive to said chosen logical elements and all of said pointers from said logical data elements to said physical data elements.

5. The system of claim 2, wherein said statement generating means generates a NEITHER statement to retrieve and return all possible combinations of said chosen logical elements using all of said pointers from said logical data elements to said physical data elements.

6. The system of claim 2, wherein said statement generating means generates a NATURAL statement which retrieves and returns a model of a single chosen logical element wherein the parts of said model are linked to each other.

7. The system of claim 2, wherein said statement generating means generates standard structured query language (SQL) statements, which consist of at least one SELECT clause, a QUALIFIER clause and an ORDER BY clause.

8. The system of claim 2, wherein said pointers in said data dictionary means are set up by a system administrator.

9. The system of claim 2, wherein a system administrator can determine which users can access said physical data elements and said logical data elements.

10. The system of claim 2, wherein said chosen criteria includes said logical elements, qualifiers and order requests.

11. The system of claim 1, wherein data accessed in response to said data requests are stored in an object-oriented database.

12. The system of claim 1, wherein said modeling means comprises a wrapping means for converting said data structures into a format that resembles relational databases.

13. The system of claim 12, wherein said modeling means further comprises scanning means for scanning said relational databases to determine the structure thereof, and storage means to store said structure.

14. The system of claim 1, wherein said data dictionary means can store textual, numeric, audio and visual data.

15. The system of claim 1 wherein said data dictionary means includes a metacatolog for relating said information on multiple levels.

16. A system for integrating information from at least first and second different types of legacy database systems, the legacy database systems having physical data elements stored therein, the system comprising:

first and second interfaces for communicating with the first and second different types of legacy database systems; and an object-oriented database management system communicating with the first and second interfaces and including:

an object-oriented database, means for modeling the tables and the physical data elements therein in the different databases and types of databases in the legacy systems to generate logical data elements corresponding to the tables in the legacy systems, logical data elements corresponding to the physical data elements, and pointers from the logical data elements to the physical data elements in the legacy systems, and a metacatalog maintained as an object-oriented database for storing the logical data elements generated by the modeling means.

17. The system of claim 16, wherein at least some of the legacy database systems include relational tables, and wherein the means for modeling includes means for determining which foreign keys in the relational tables are necessary, removing unnecessary foreign keys in the relational tables, and removing relational tables made only of foreign keys.

18. The system of claim 16, further comprising a user interface, communicating with the object-oriented database management system, for providing to the object-oriented database management system queries from a user to access logical data elements in the object-oriented databases.

19. A method for integrating multiple different types of legacy systems with physical elements into a single object-oriented framework, the method comprising the steps of:

scanning header tables from a number of different tables in the legacy systems to create data elements for the tables;

storing the data elements created in the scanning step in an object-oriented database;

for each table, modeling the physical data elements in the table to create logical data elements;

storing the logical data elements created in the modeling step in the objectoriented database;

creating pointers from the data element for each table to the logical data elements that represent the physical data elements in the respective tables;

determining a datatype for each physical data element based on the header tables of the legacy systems;

using the datatype determined in the determining step as the datatype for each logical data element; and creating logical elements in a metacatalog during the scanning and modeling steps to create a logical element in the metacatalog each time a physical element is modeled, the system automatically creating a unified environment from multiple different databases and types of databases in legacy systems to provide a consistent view across all of the legacy systems.

20. The method of claim 19, further comprising steps of providing pointers in tables to which foreign keys point, and deleting the data elements that are foreign keys in other tables, the system thereby removing unnecessary foreign keys.

* * * * *

UNITED STATES PATENT AND TRADEMARK OFFICE
CERTIFICATE OF CORRECTION

PATENT NO. : 5,764,973
DATED : June 9, 1998
INVENTOR(S) : Lunceford et al.

It is certified that error appears in the above-identified patent and that said Letters Patent is hereby corrected as shown below:

At column 18, in claim 19 at line 12 therein: "objectoriented" should be -- object-oriented --.

On the face of the patent, under "[56] References Cited," the following references should be included:

| | | | Class | Sub Class |
|---|---|---|---|---|
| 4,905,163 | 2/1990 | Garber et al. | 706 | 55 |
| 4,914,590 | 4/1990 | Loatman et al. | 704 | 8 |
| 4,930,071 | 5/1990 | Tou et al. | 704 | 4 |
| 4,953,080 | 8/1990 | Dysart et al. | 707 | 103 |
| 4,989,132 | 1/1991 | Mellender et al. | 395 | 705 |
| 5,161,223 | 11/1992 | Abraham et al. | 707 | 3 |

UNITED STATES PATENT AND TRADEMARK OFFICE
CERTIFICATE OF CORRECTION

PATENT NO. : 5,764,973
DATED : June 9, 1998
INVENTOR(S) : Lunceford et al.

It is certified that error appears in the above-identified patent and that said Letters Patent is hereby corrected as shown below:

| | | | | |
|---|---|---|---|---|
| 5,161,225 | 11/1992 | Abraham et al. | 707 | 103 |
| 5,204,947 | 4/1993 | Bernstein et al. | 345 | 357 |
| 5,235,701 | 8/1993 | Ohler et al. | 707 | 1 |

Signed and Sealed this

Seventeenth Day of November, 1998

Attest:

BRUCE LEHMAN

Attesting Officer

Commissioner of Patents and Trademarks